United States Patent
Acosta Gonzalez

(10) Patent No.: US 11,953,864 B2
(45) Date of Patent: *Apr. 9, 2024

(54) SELF LEARNING CONTROL SYSTEM AND METHOD FOR OPTIMIZING A CONSUMABLE INPUT VARIABLE

(71) Applicant: S.A. Armstrong Limited, Scarborough (CA)

(72) Inventor: Marcelo Javier Acosta Gonzalez, Scarborough (CA)

(73) Assignee: S.A. Armstrong Limited, Scarborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,138

(22) Filed: Jul. 10, 2023

(65) Prior Publication Data

US 2023/0350353 A1   Nov. 2, 2023

Related U.S. Application Data

(63) Continuation of application No. 17/988,116, filed on Nov. 16, 2022, now Pat. No. 11,740,594, which is a
(Continued)

(51) Int. Cl.
*G05B 13/04* (2006.01)
*F04D 15/02* (2006.01)
(Continued)

(52) U.S. Cl.
CPC .......... *G05B 13/04* (2013.01); *F04D 15/0209* (2013.01); *F04D 15/029* (2013.01);
(Continued)

(58) Field of Classification Search
CPC ...... G05B 13/04; G05B 13/041; G05B 15/02; G05B 19/042; F04D 15/0209;
(Continued)

(56) References Cited

U.S. PATENT DOCUMENTS

| 4,021,146 A | 5/1977 | Tippetts et al. |
| 5,522,707 A | 6/1996 | Potter |

(Continued)

FOREIGN PATENT DOCUMENTS

| CN | 1415915 A | 5/2003 |
| CN | 101033749 A | 9/2007 |

(Continued)

OTHER PUBLICATIONS

Nelson, Simulation Modeling of a Central Chiller Plant, ASHRAE paper 7547, presented at the 2012 ASHRAE Winter Conference in Chicago.

(Continued)

*Primary Examiner* — Kidest Bahta
(74) *Attorney, Agent, or Firm* — Bret E. Field; Bozicevic, Field & Francis LLP

(57) ABSTRACT

A control system for an operable system such as a flow control system or temperature control system. The system operates in a control loop to regularly update a model with respect at least one optimizable input variable based on the detected variables. The model provides prediction of use of the input variables in all possible operation points or paths of the system variables which achieve an output setpoint. In some example embodiments, the control loop is performed during initial setup and subsequent operation of the one or more operable elements in the operable system. The control system is self-learning in that at least some of the initial and subsequent parameters of the system are determined automatically during runtime.

25 Claims, 15 Drawing Sheets

Related U.S. Application Data continuation of application No. 17/163,907, filed on Feb. 1, 2021, now Pat. No. 11,531,309, which is a continuation of application No. 16/534,333, filed on Aug. 7, 2019, now Pat. No. 10,948,882, which is a continuation of application No. 15/785,136, filed on Oct. 16, 2017, now Pat. No. 10,429,802, which is a continuation of application No. 14/443,207, filed as application No. PCT/CA2013/050868 on Nov. 13, 2013, now Pat. No. 9,823,627.

(60) Provisional application No. 61/753,549, filed on Jan. 17, 2013, provisional application No. 61/736,051, filed on Dec. 12, 2012.

(51) Int. Cl.
  *F04D 27/00* (2006.01)
  *G05B 15/02* (2006.01)
  *G05B 19/042* (2006.01)
  *G05D 7/06* (2006.01)

(52) U.S. Cl.
  CPC ........... *F04D 27/00* (2013.01); *G05B 13/041* (2013.01); *G05B 15/02* (2013.01); *G05B 19/042* (2013.01); *G05D 7/0617* (2013.01); *G05D 7/0682* (2013.01)

(58) Field of Classification Search
  CPC ..... F04D 15/029; F04D 27/00; G05D 7/0617; G05D 7/0682; G05D 7/0623; Y02B 30/70
  See application file for complete search history.

(56) References Cited

U.S. PATENT DOCUMENTS

| | | | |
|---|---|---|---|
| 5,535,814 | A | 7/1996 | Hartman |
| 5,640,049 | A | 6/1997 | Rostoker et al. |
| 5,640,491 | A | 6/1997 | Bhat et al. |
| 5,742,500 | A | 4/1998 | Irvin |
| 5,946,673 | A | 8/1999 | Francone et al. |
| 6,016,656 | A | 1/2000 | Sorensen |
| 6,045,332 | A | 4/2000 | Lee et al. |
| 6,070,660 | A | 6/2000 | Byrnes et al. |
| 6,099,264 | A | 8/2000 | Du |
| 6,109,030 | A | 8/2000 | Geringer |
| 6,185,946 | B1 | 2/2001 | Hartman |
| 6,257,007 | B1 | 7/2001 | Hartman |
| 6,257,833 | B1 | 7/2001 | Bates |
| 6,354,805 | B1 | 3/2002 | Moller |
| 6,394,120 | B1 | 5/2002 | Wichert |
| 6,464,464 | B2 | 10/2002 | Sabini et al. |
| 6,468,042 | B2 | 10/2002 | Moller |
| 6,592,340 | B1 | 7/2003 | Horo et al. |
| 6,663,352 | B2 | 12/2003 | Sabini et al. |
| 6,913,166 | B2 | 7/2005 | Cline et al. |
| 7,010,393 | B2 | 3/2006 | Mirsky et al. |
| 7,036,559 | B2 | 5/2006 | Stanimirovic |
| 7,341,201 | B2 | 3/2008 | Stanimirovic |
| 7,480,544 | B2 | 1/2009 | Wang et al. |
| 7,797,958 | B2 | 9/2010 | Alston et al. |
| 7,857,600 | B2 | 12/2010 | Koehl |
| 7,945,411 | B2 | 5/2011 | Kernan et al. |
| 8,126,574 | B2 | 2/2012 | Discenzo et al. |
| 8,328,523 | B2 | 12/2012 | Kernan et al. |
| 8,374,709 | B2 * | 2/2013 | Lou ................. G05B 13/04 700/28 |
| 8,660,702 | B2 | 2/2014 | Raghavachari |
| 8,700,221 | B2 | 4/2014 | Cheng et al. |
| 2002/0136642 | A1 | 9/2002 | Moller |
| 2004/0186927 | A1 | 9/2004 | Eryurek et al. |
| 2004/0247448 | A1 | 12/2004 | Kunkler et al. |
| 2005/0006488 | A1 | 1/2005 | Stanimirovic |
| 2005/0123408 | A1 | 6/2005 | Koehl |
| 2005/0192680 | A1 | 9/2005 | Cascia et al. |
| 2006/0112478 | A1 | 6/2006 | Kolar et al. |
| 2006/0195409 | A1 | 8/2006 | Sabe et al. |
| 2006/0230772 | A1 | 10/2006 | Wacknov et al. |
| 2006/0272830 | A1 | 12/2006 | Fima |
| 2007/0154320 | A1 | 7/2007 | Stiles et al. |
| 2007/0212210 | A1 | 9/2007 | Kernan et al. |
| 2007/0212230 | A1 | 9/2007 | Stavale et al. |
| 2008/0110189 | A1 | 5/2008 | Alston et al. |
| 2009/0120511 | A1 | 5/2009 | Weingarten |
| 2009/0218968 | A1 | 9/2009 | Jeung |
| 2010/0247332 | A1 | 9/2010 | Stiles et al. |
| 2010/0300540 | A1 | 12/2010 | Grosse Westhoff et al. |
| 2010/0306001 | A1 | 12/2010 | Discenco et al. |
| 2011/0181431 | A1 | 7/2011 | Koehl |
| 2011/0192471 | A1 | 8/2011 | Kirst et al. |
| 2011/0276180 | A1 | 11/2011 | Seem |
| 2011/0276185 | A1 | 11/2011 | Watanabe |
| 2012/0078424 | A1 | 3/2012 | Raghavachari |
| 2012/0173023 | A1 | 7/2012 | Fuxman et al. |
| 2012/0173027 | A1 | 7/2012 | Cheng et al. |
| 2012/0271462 | A1 | 10/2012 | Dempster et al. |
| 2012/0328453 | A1 | 12/2012 | Lisk |
| 2013/0312443 | A1 | 11/2013 | Tamaki et al. |

FOREIGN PATENT DOCUMENTS

| | | |
|---|---|---|
| CN | 102301288 A | 12/2011 |
| DE | 19618462 A1 | 11/1997 |
| DE | 102009013756 A1 | 9/2010 |
| EP | 0905596 A2 | 3/1999 |
| EP | 2246569 A2 | 11/2010 |
| EP | 1323986 B1 | 1/2011 |
| EP | 1933097 B1 | 4/2013 |
| GB | 2432015 A | 5/2007 |
| WO | WO2005064167 A1 | 7/2005 |
| WO | WO2012095249 A1 | 7/2012 |

OTHER PUBLICATIONS

Kallesoe et al., Adaptive Selection of Control-Curves for Domestic Circulators, undated.
Canada International Searching Authority, International Search Report and Written Opinion in respect of PCT/CA2013/050867, dated Dec. 31, 2013.
IPEA/CA, International Preliminary Report on Patentability in respect of PCT/CA2013/050867, dated Mar. 13, 2015.
Extended European Search Report for European application No. 13861619.8 dated Oct. 26, 2016, 9 pages.
Extended European Search Report for European application No. 13863109.8 dated Oct. 25, 2016, 8 pages.
Office Action for Chinese application No. 201380065187.7 dated Apr. 6, 2017, 40 pages, including an English translation.
Office Action for Chinese application No. 201380065327.0 dated Apr. 13, 2017, 54 pages, including an English translation.
Communication pursuant to Article 94(3) EPC issued for European Application No. 13861619.8 dated Jun. 25, 2019, 8 pages.
Search Report for United Arab Emirates Patent Application No. 0787/2015, 5 pages.
Examination Report for United Arab Emirates Patent Application No. 0787/2015, 11 pages.
Notice on the First Office Action for Chinese Patent Application No. 201710530366.3, dated Nov. 6, 2019, with its English translation, 35 pages.

* cited by examiner

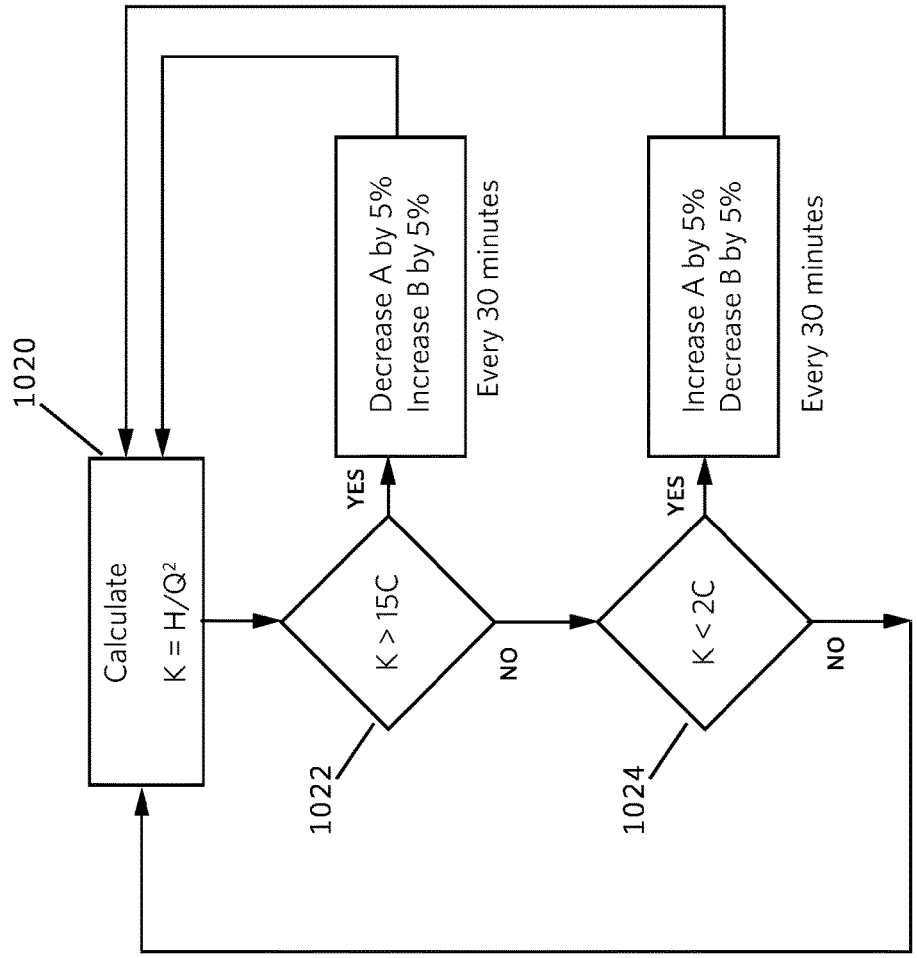

SELF LEARNING CONTROL SYSTEM AND METHOD FOR OPTIMIZING A CONSUMABLE INPUT VARIABLE

CROSS-REFERENCE TO RELATED APPLICATIONS

This application is a continuation application under 35 U.S.C. § 111(a) of U.S. patent application Ser. No. 17/988,116 filed Nov. 16, 2022 entitled SELF LEARNING CONTROL SYSTEM AND METHOD FOR OPTIMIZING A CONSUMABLE INPUT VARIABLE, which is a continuation application under 35 U.S.C. § 111(a) of U.S. patent application Ser. No. 17/163,907 filed Feb. 1, 2021 entitled SELF LEARNING CONTROL SYSTEM AND METHOD FOR OPTIMIZING A CONSUMABLE INPUT VARIABLE which issued as U.S. Pat. No. 11,531,309 on Dec. 20, 2022, which is a continuation application under 35 U.S.C. § 111(a) of U.S. patent application Ser. No. 16/534,333 filed Aug. 7, 2019 entitled SELF LEARNING CONTROL SYSTEM AND METHOD FOR OPTIMIZING A CONSUMABLE INPUT VARIABLE which issued as U.S. Pat. No. 10,948,882 on Mar. 16, 2021, which is a continuation application under 35 U.S.C. § 111(a) of U.S. patent application Ser. No. 15/785,136 filed Oct. 16, 2017 entitled SELF LEARNING CONTROL SYSTEM AND METHOD FOR OPTIMIZING A CONSUMABLE INPUT VARIABLE which issued as U.S. Pat. No. 10,429,802 on Oct. 1, 2019, which is a continuation application under 35 U.S.C. § 111(a) of U.S. patent application Ser. No. 14/443,207 entitled SELF LEARNING CONTROL SYSTEM AND METHOD FOR OPTIMIZING A CONSUMABLE INPUT VARIABLE which issued as U.S. Pat. No. 9,823,627 on Nov. 21, 2017, which is a National Stage Application entered May 15, 2015 under 35 USC § 371 of PCT/CA2013/050868 filed Nov. 13, 2013 entitled SELF LEARNING CONTROL SYSTEM AND METHOD FOR OPTIMIZING A CONSUMABLE INPUT VARIABLE, which claims the benefit of priority to U.S. Provisional Patent Application No. 61/736,051 filed Dec. 12, 2012 entitled "CO-ORDINATED SENSORLESS CONTROL SYSTEM", and to U.S. Provisional Patent Application No. 61/753,549 filed Jan. 17, 2013 entitled "SELF LEARNING CONTROL SYSTEM AND METHOD FOR OPTIMIZING A CONSUMABLE INPUT VARIABLE", all of which are herein incorporated by reference in their entirety into the Detailed Description of Example Embodiments, herein below.

TECHNICAL FIELD

Some example embodiments relate to control systems, and some example embodiments relate specifically to flow control systems or temperature control systems.

BACKGROUND

Systems with more degrees of freedom than restrictions and goals can be operated in many different ways while still achieving the same stated goals. A typical example is a car which can be driven between two points through different routes, at different speeds, in different gears and using the brakes differently.

If how these systems perform on non-stated goals is analyzed, usually room for improvement is found. For instance, most cars are neither operated using the minimum possible amount of gas, nor wearing them as little as possible, nor achieving the minimum transit time legally and safely possible.

Once an optimal system is designed for a given environment, it is often the case where the environment itself changes the system no longer optimizes its originally designed function.

Additional difficulties with existing systems may be appreciated in view of the description below.

SUMMARY

In accordance with some aspects, there is provided a control system for temperature control systems and circulating devices such as pumps, boosters and fans, centrifugal machines, and related systems.

In one aspect, there is provided a control system for controlling an operable system, comprising: one or more operable elements resulting in output variables, wherein there is more than one operation point or path of system variables of the operable system that can provide a given output setpoint, wherein at least one system variable at an operation point or path restricts operation of another system variable at the operation point or path; and one or more controllers configured to operate in a control loop to: detect input variables including one or more optimizable input variables which are required to determine the output variables, detect the system variables, update a model with respect to the at least one optimizable input variable based on the detected input variables and the detected system variables, the model providing prediction of use of the input variables in all possible operation points or paths of the system variables which achieve an output setpoint, and operate, based on one or more of the detected input variables and the detected system variables, the one or more operable elements in accordance with the optimized model to provide an optimal operation point or path of the system variables which achieves the output setpoint which optimizes use of the at least one optimizable input variable.

In another aspect, there is provided a flow control system for controlling a flow system, comprising: a circulating pump having a variably controllable motor resulting in output variables including pressure and flow for the flow system; and one or more controllers configured to operate in a control loop to: detect input variables including one or more optimizable input variables which are required to determine the output variables, detect the output variables, update a model with respect to the at least one optimizable input variable based on the detected input variables and the detected output variables, the model providing prediction of use of the input variables in all possible operation points or paths of the output variables which achieve an output setpoint, optimize a control curve in accordance with the model with respect to the at least one optimizable input variable based on the detected input variables and the detected output variables, the control curve providing co-ordination of the operation point of the pressure and flow in order to achieve the output setpoint, and operate, based on one or more of the detected variables, the variably controllable motor in accordance with the optimized control curve to provide the operation point of the pressure and flow to achieve the output setpoint.

In another aspect, there is provided a method system for controlling an operable system, the operable system including one or more operable elements resulting in output variables, wherein there is more than one operation point or path of system variables of the operable system that can provide a given output setpoint, wherein at least one system variable at an operation point or path restricts operation of another system variable at the operation point or path, the method being performed as a control loop and comprising: detecting input variables including one or more optimizable input variables which are required to determine the output variables; detecting the system variables; updating a model with respect to the at least one optimizable input variable based on the detected input variables and the detected system variables, the model providing prediction of use of the input variables in all possible operation points or paths of the system variables which achieve an output setpoint; and operating, based on one or more of the detected input variables and the detected system variables, the one or more operable elements in accordance with the optimized model to provide an optimal operation point or path of the system variables which achieves the output setpoint which optimizes use of the at least one optimizable input variable.

In another aspect, there is provided a non-transitory computer readable medium comprising instructions which, when executed by one or more controllers, cause the controllers to control an operable system in a control loop, the operable system including one or more operable elements resulting in output variables, wherein there is more than one operation point or path of system variables of the operable system that can provide a given output setpoint, wherein at least one system variable at an operation point or path restricts operation of another system variable at the operation point or path, the instructions comprising: instructions for detecting input variables including one or more optimizable input variables which are required to determine the output variables; instructions for detecting the system variables; instructions for updating a model with respect to the at least one optimizable input variable based on at least one of the detected input variables and the detected system variables, the model providing prediction of use of the input variables in all possible operation points or paths of the system variables which achieve an output setpoint; and instructions for operating, based on one or more of the detected input variables and the detected system variables, the one or more operable elements in accordance with the optimized model to provide an optimal operation point or path of the system variables which achieves the output setpoint which optimizes use of the at least one optimizable input variable.

BRIEF DESCRIPTION OF THE DRAWINGS

Embodiments will now be described, by way of example only, with reference to the attached Figures, wherein:

FIGS. 10A, 10B and 10C illustrate example flow diagrams for adjusting the operation graph of FIG. 9, in accordance with example embodiments;

Like reference numerals may be used throughout the Figures to denote similar elements and features.

DETAILED DESCRIPTION OF EXAMPLE EMBODIMENTS

Figure 1:
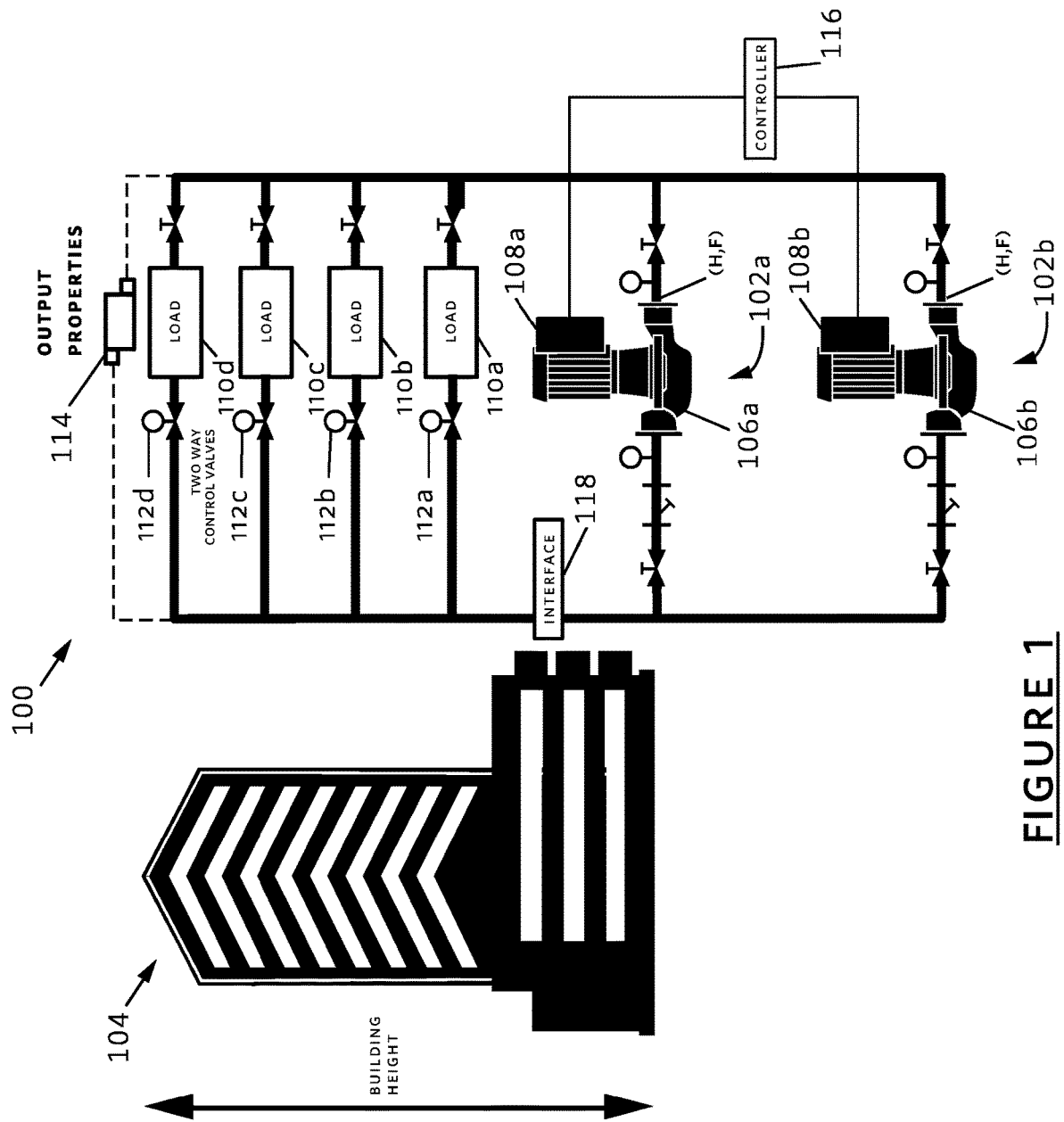
FIG. 1 illustrates an example block diagram of a circulating system having intelligent variable speed control pumps, to which example embodiments may be applied.

At least some example embodiments generally provide an automated control system for temperature control systems and circulating devices such as pumps, boosters and fans, centrifugal machines, and related systems.

In some example embodiments, there is provided a control system for an operable system such as a flow control system or temperature control system. Example embodiments relate to "processes" in the industrial sense, meaning a process that outputs product(s) (e.g. hot water, air) using inputs (e.g. cold water, fuel, air, etc.). The system operates in a control loop to regularly optimize a model with respect at least one optimizable input variable based on the detected variables. The model provides prediction of input variable use in all possible operation points or paths of the system variables which achieve an output setpoint. In some example embodiments, the control loop is performed during initial setup and subsequent operation of the one or more operable elements in the operable system. The control system is self-learning in that at least some of the initial and subsequent parameters of the system are determined automatically during runtime, i.e., would not require manual configuration.

In pumping systems where the flow demand changes over time there are several conventional procedures to adapt the operation of the pump(s) to satisfy such demand without exceeding the pressure rating of the system, burning seals or creating vibration, and they may also attempt to optimize the energy use.

Traditional systems have used one or several constant speed pumps and attempted to maintain the discharge pressure (local or remote) constant, when the flow demand changed, by changing the number of running pumps and/or by operating pressure reducing, bypass and discharge valves.

One popular system in use today has several pumps; each equipped with an electronic variable speed drive, and operates them to control one or more pressure(s) remotely in the system, measured by remote sensors (usually installed at the furthest location served or ⅔ down the line). At the remote sensor location(s) a minimum pressure has to be maintained, so the deviation of the measured pressure(s) with respect to the target(s) is calculated. The speed of the running pumps is then adjusted (up or down) to the lowest that maintains all the measured pressures at or above their targets. When the speed of the running pumps exceeds a certain value (usually 95% of the maximum speed), another pump is started. When the speed falls below a certain value (50% or higher, and sometimes dependent on the number of pumps running), a pump is stopped. This sequencing method is designed to minimize the number of pumps used to provide the required amount of flow.

An alternative to this type of system measures the flow and pressure at the pump(s) and estimates the remote pressure by calculating the pressure drop in the pipes in between. The pump(s) are then controlled as per the procedure described above, but using the estimated remote pressure instead of direct measurements. This alternative saves the cost of the remote sensor(s), plus their wiring and installation, but requires a local pressure sensor and flow meter.

One type of pump device estimates the local flow and/or pressure from the electrical variables provided by the electronic variable speed drive. This technology is typically referred to in the art as "sensorless". Example implementations using a single pump are described in PCT Patent Application Publication No. WO 2005/064167 to Witzel et al., U.S. Pat. No. 7,945,411 to Kernan et al., U.S. Pat. No. 6,592,340 to Horo et al. and DE Patent No. 19618462 to Foley. The single device can then be controlled, but using the estimated local pressure and flow to then infer the remote pressure, instead of direct fluid measurements. This method saves the cost of sensors and their wiring and installation, however, these references may be limited to the use of a single pump.

In one example embodiment, there is provided a control system for sourcing a load, including: a plurality of sensorless circulating devices each including a respective circulating operable element arranged to source the load, each device configured to self-detect power and speed of the respective device; and one or more controllers configured to: correlate, for each device, the detected power and speed to one or more output properties including pressure and flow, and co-ordinate control of each of the devices to operate at least the respective circulating operable element to co-ordinate one or more output properties to achieve a pressure setpoint at the load.

Reference is first made to FIG. 1 which shows in block diagram form a circulating system 100 having intelligent variable speed circulating devices such as control pumps 102a, 102b (each or individually referred to as 102), to which example embodiments may be applied. The circulating system 100 may relate to a building 104 (as shown), a campus (multiple buildings), vehicle, plant, generator, heat exchanger, or other suitable infrastructure or load. Each control pump 102 may include one or more respective pump devices 106a, 106b (each or individually referred to as 106) and a control device 108a, 108b (each or individually referred to as 108) for controlling operation of each pump device 106. The particular circulating medium may vary depending on the particular application, and may for example include glycol, water, air, fuel, and the like.

As illustrated in FIG. 1, the circulating system 100 may include one or more loads 110a, 110b, 110c, 110d, wherein each load may be a varying usage requirement based on HVAC, plumbing, etc. Each 2-way valve 112a, 112b, 112c, 112d may be used to manage the flow rate to each respective load 110a, 110b, 110c, 110d. As the differential pressure across the load decreases, the control device 108 responds to this change by increasing the pump speed of the pump device 106 to maintain or achieve the pressure setpoint. If the differential pressure across the load increases, the control device 108 responds to this change by decreasing the pump speed of the pump device 106 to maintain or achieve the pressure setpoint. In some example embodiments, the control valves 112a, 112b, 112c, 112d can include faucets or taps for controlling flow to plumbing systems. In some example embodiments, the pressure setpoint can be fixed, continually or periodically calculated, externally determined, or otherwise specified.

The control device 108 for each control pump 102 may include an internal detector or sensor, typically referred to in the art as a "sensorless" control pump because an external sensor is not required. The internal detector may be configured to self-detect, for example, device properties such as the power and speed of the pump device 106. Other input variables may be detected. The pump speed of the pump device 106 may be varied to achieve a pressure and flow setpoint of the pump device 106 in dependence of the internal detector. A program map may be used by the control device 108 to map a detected power and speed to resultant output properties, such as head output and flow output (H, F).

Referring still to FIG. 1, the output properties of each control device 102 are controlled to, for example, achieve a pressure setpoint at the combined output properties 114, shown at a load point of the building 104. The output properties 114 represent the aggregate or total of the individual output properties of all of the control pumps 102 at the load, in this case, flow and pressure. In typical conventional systems, an external sensor (not shown) would be placed at the location of the output properties 114 and associated controls (not shown) would be used to control or vary the pump speed of the pump device 106 to achieve a pressure setpoint in dependence of the detected flow by the external sensor. In contrast, in example embodiments the output properties 114 are instead inferred or correlated from the self-detected device properties, such as the power and speed of the pump devices 106, and/or other input variables. As shown, the output properties 114 are located at the most extreme load position at the height of the building 104 (or end of the line), and in other example embodiments may be located in other positions such as the middle of the building 104, ⅔ from the top of the building 104 or down the line, or at the farthest building of a campus.

One or more controllers 116 (e.g. processors) may be used to co-ordinate the output flow of the control pumps 102. As shown, the control pumps 102 may be arranged in parallel with respect to the shared loads 110a, 110b, 110c, 110d. For example, the individual output properties of each of the control pumps 102 can be inferred and controlled by the controller 116 so as to achieve the aggregate output properties 114. This feature is described in greater detail below.

In some examples, the circulating system 100 may be a chilled circulating system ("chiller plant"). The chiller plant may include an interface 118 in thermal communication with a secondary circulating system. The control valves 112a, 112b, 112c, 112d manage the flow rate to the cooling coils (e.g., load 110a, 110b, 110c, 110d). Each 2-way valve 112a, 112b, 112c, 112d may be used to manage the flow rate to each respective load 110a, 110b, 110c, 110d. As a valve 112a, 112b, 112c, 112d opens, the differential pressure across the valve decreases. The control device 108 responds to this change by increasing the pump speed of the pump device 106 to achieve a specified output setpoint. If a control valve 112a, 112b, 112c, 112d closes, the differential pressure across the valve increases, and the control devices 108 respond to this change by decreasing the pump speed of the pump device 106 to achieve a specified output setpoint.

In some other examples, the circulating system 100 may be a heating circulating system ("heating plant"). The heater plant may include an interface 118 in thermal communication with a secondary circulating system. In such examples, the control valves 112a, 112b, 112c, 112d manage the flow rate to heating elements (e.g., load 110a, 110b, 110c, 110d). The control devices 108 respond to changes in the heating elements by increasing or decreasing the pump speed of the pump device 106 to achieve the specified output setpoint.

Referring still to FIG. 1, the pump device 106 may take on various forms of pumps which have variable speed control. In some example embodiments, the pump device 106 includes at least a sealed casing which houses the pump device 106, which at least defines an input element for receiving a circulating medium and an output element for outputting the circulating medium. The pump device 106 includes one or more operable elements, including a variable motor which can be variably controlled from the control device 108 to rotate at variable speeds. The pump device 106 also includes an impeller which is operably coupled to the motor and spins based on the speed of the motor, to circulate the circulating medium. The pump device 106 may further include additional suitable operable elements or features, depending on the type of pump device 106. Device properties of the pump device 106, including the motor speed and power, may be self-detected by the control device 108.

Figure 2:
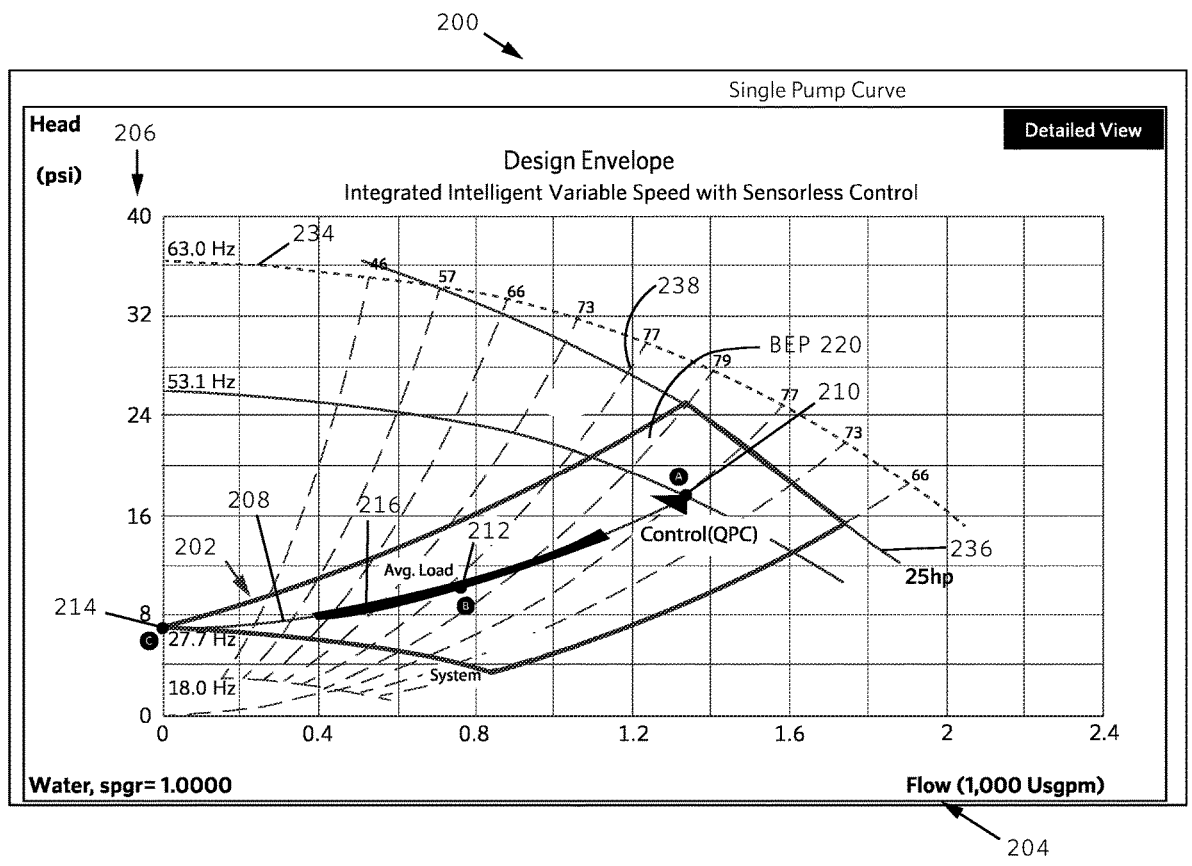
FIG. 2 illustrates an example operation graph of a variable speed control pump.

Reference is now made to FIG. 2, which illustrates a graph 200 showing an example suitable range of operation 202 for a variable speed device, in this example the control pump 102. The range of operation 202 is illustrated as a polygon-shaped region or area on the graph 200, wherein the region is bounded by a border represents a suitable range of operation. For example, a design point may be, e.g., a maximum expected system load as in point A (210) as required by a system such as a building 104 at the output properties 114 (FIG. 1).

The design point, Point A (210), can be estimated by the system designer based on the flow that will be required by a system for effective operation and the head/pressure loss required to pump the design flow through the system piping and fittings. Note that, as pump head estimates may be over-estimated, most systems will never reach the design pressure and will exceed the design flow and power. Other systems, where designers have under-estimated the required head, will operate at a higher pressure than the design point. For such a circumstance, one feature of properly selecting one or more intelligent variable speed pumps is that it can be properly adjusted to delivery more flow and head in the system than the designer specified.

The design point can also be estimated for operation with multiple controlled pumps 102, with the resulting flow requirements allocated between the controlled pumps 102. For example, for controlled pumps of equivalent type or performance, the total estimated required output properties 114 (e.g. the maximum flow to maintain a required pressure design point at that location of the load) of a system or building 104 may be divided equally between each controlled pump 102 to determine the individual design points, and to account for losses or any non-linear combined flow output. In other example embodiments, the total output properties (e.g. at least flow) may be divided unequally, depending on the particular flow capacities of each control pump 102, and to account for losses or any non-linear combined flow output. The individual design setpoint, as in point A (210), is thus determined for each individual control pump 102.

The graph 200 includes axes which include parameters which are correlated. For example, flow squared is approximately proportional to head, and flow is approximately proportional to speed. In the example shown, the abscissa or x-axis 204 illustrates flow in U.S. gallons per minute (GPM) and the ordinate or y-axis 206 illustrates head (H) in pounds per square inch (psi) (alternatively in feet). The range of operation 202 is a superimposed representation of the control pump 102 with respect to those parameters, onto the graph 200.

The relationship between parameters may be approximated by particular affinity laws, which may be affected by volume, pressure, and Brake Horsepower (BHP). For example, for variations in impeller diameter, at constant speed: $D1/D2=Q1/Q2$; $H1/H2=D1^2/D2^2$; $BHP1/BHP2=D1^3/D2^3$. For example, for variations in speed, with constant impeller diameter: $S1/S2=Q1/Q2$; $H1/H2=S1^2/S2^2$; $BHP1/BHP2=S1^3/S2^3$. Wherein: D=Impeller Diameter (Ins/mm); H=Pump Head (Ft/m); Q=Pump Capacity (gpm/lps); S=Speed (rpm/rps); BHP=Brake Horsepower (Shaft Power-hp/kW).

Also illustrated is a best efficiency point (BEP) curve 220 of the control pump 102. The partial efficiency curves are also illustrated, for example the 77% efficiency curve 238. In some example embodiments, an upper boundary of the range of operation 202 may also be further defined by a motor power curve 236 (e.g. maximum horsepower). In alternate embodiments, the boundary of the range of operation 202 may also be dependent on a pump speed curve 234 (shown in Hz) rather than a strict maximum motor power curve 236.

As shown in FIG. 2, one or more control curves 208 (one shown) may be defined and programmed for an intelligent variable speed device, such as the control pump 102. Depending on changes to the detected parameters (e.g. internal or inferred detection of changes in flow/load), the operation of the pump device 106 may be maintained to operate on the control curve 208 based on instructions from the control device 108 (e.g. at a higher or lower flow point). This mode of control may also be referred to as quadratic pressure control (QPC), as the control curve 208 is a quadratic curve between two operating points (e.g., point A (210): maximum head, and point C (214): minimum head). Reference to "intelligent" devices herein includes the control pump 102 being able to self-adjust operation of the pump device 106 along the control curve 208, depending on the particular required or detected load.

Other example control curves other than quadratic curves include constant pressure control and proportional pressure control (sometimes referred to as straight-line control). Selection may also be made to another specified control curve (not shown), which may be either pre-determined or calculated in real-time, depending on the particular application.

Figure 3:
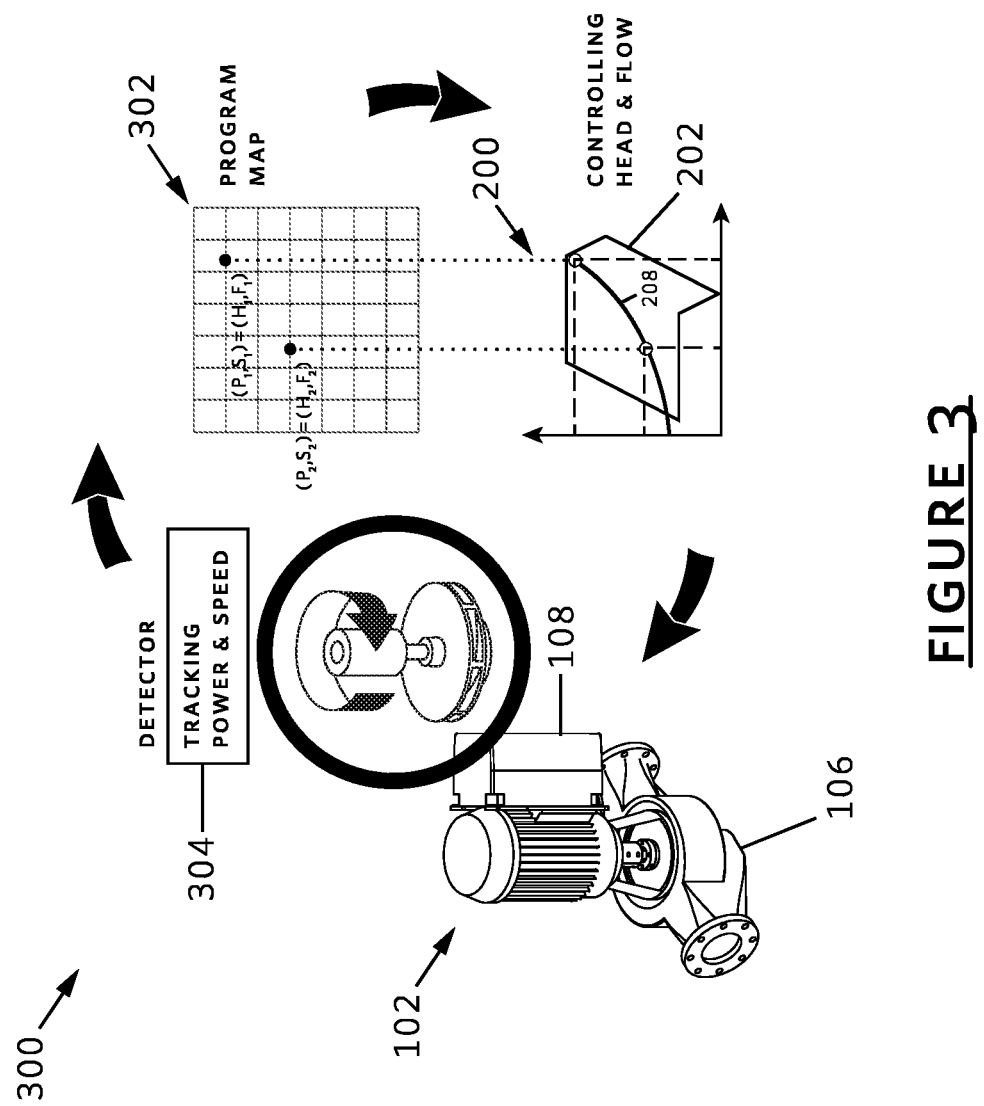
FIG. 3 shows a diagram illustrating internal sensing control of a variable speed control pump.

Reference is now made to FIG. 3, which shows a diagram 300 illustrating internal sensing control (sometimes referred to as "sensorless" control) of the control pump 102 within the range of operation 202, in accordance with example embodiments. For example, an external or proximate sensor would not be required in such example embodiments. An internal detector 304 or sensor may be used to self-detect device properties such as an amount of power and speed (P, S) of an associated motor of the pump device 106. A program map 302 stored in a memory of the control device 108 is used by the control device 108 to map or correlate the detected power and speed (P, S), to resultant output properties, such as head and flow (H, F) of the device 102, for a particular system or building 104. During operation, the control device 108 monitors the power and speed of the pump device 106 using the internal detector 304 and establishes the associated head-flow condition relative to the system requirements. The associated head-flow (H, F) condition of the device 102 can be used to calculate the individual contribution of the device 102 to the total output properties 114 (FIG. 1) at the load. The program map 302 can be used to map the power and speed to control operation of the pump device 106 onto the control curve 208, wherein a point on the control curve is used as the desired device setpoint. For example, referring to FIG. 1, as control valves 112a, 112b, 112c, 112d open or close to regulate flow to the cooling coils (e.g. load 110a, 110b, 110c, 110d), the control device 108 automatically adjusts the pump speed to match the required system pressure requirement at the current flow.

Note that the internal detector 304 for self-detecting device properties contrasts with some conventional existing systems which may use a local pressure sensor and flow meter which merely directly measures the pressure and flow across the control pump 102. Such variables (local pressure sensor and flow meter) may not be considered device properties, in example embodiments.

Another example embodiment of a variable speed sensorless device is a compressor which estimates refrigerant flow and lift from the electrical variables provided by the electronic variable speed drive. In an example embodiment, a "sensorless" control system may be used for one or more cooling devices in a controlled system, for example as part of a "chiller plant" or other cooling system. For example, the variable speed device may be a cooling device including a controllable variable speed compressor. In some example embodiments, the self-detecting device properties of the cooling device may include, for example, power and/or speed of the compressor. The resultant output properties may include, for example, variables such as temperature, humidity, flow, lift and/or pressure.

Another example embodiment of a variable speed sensorless device is a fan which estimates air flow and the pressure it produces from the electrical variables provided by the electronic variable speed drive.

Another example embodiment of a sensorless device is a belt conveyor which estimates its speed and the mass it carries from the electrical variables provided by the electronic variable speed drive.

Figure 4:
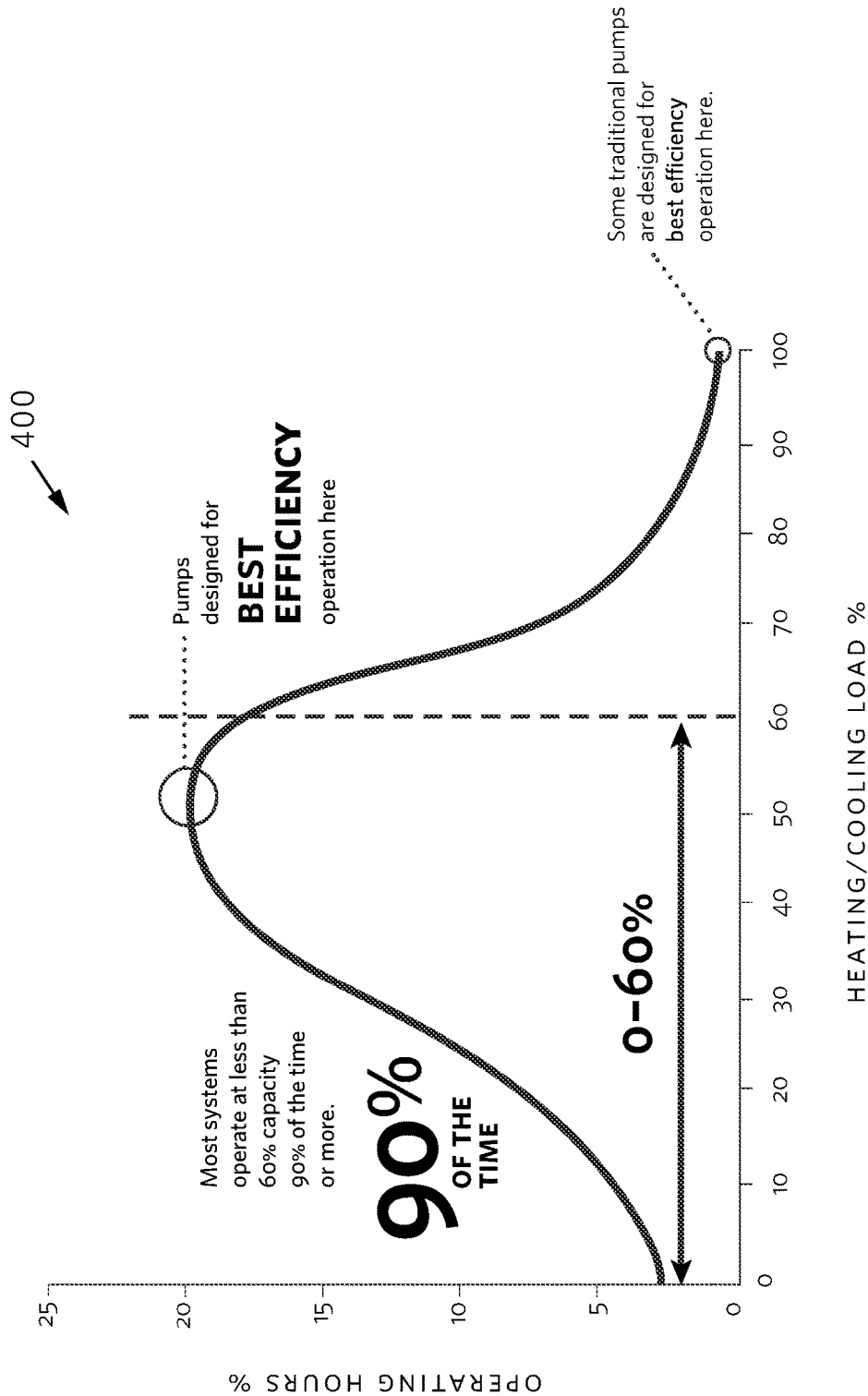
FIG. 4 illustrates an example load profile for a system such as a building.

FIG. 4 illustrates an example load profile 400 for a system such as a building 104, for example, for a projected or measured "design day". The load profile 400 illustrates the operating hours percentage versus the heating/cooling load percentage. For example, as shown, many example systems may require operation at only 0% to 60% load capacity 90% of the time or more. In some examples, a control pump 102 may be selected for best efficiency operation at partial load, for example on or about 50% of peak load. Note that, ASHRAE 90.1 standard for energy savings requires control of devices that will result in pump motor demand of no more than 30% of design wattage at 50% of design water flow (e.g. 70% energy savings at 50% of peak load). It is understand that the "design day" may not be limited to 24 hours, but can be determined for shorter or long system periods, such as one month, one year, or multiple years.

Referring again to FIG. 2, various points on the control curve 208 may be selected or identified or calculated based on the load profile 400 (FIG. 4), shown as point A (210), point B (212), and point C (214). For example, the points of the control curve 208 may be optimized for partial load rather than 100% load. For example, referring to point B (212), at 50% flow the efficiency conforms to ASHRAE 90.1 (greater than 70% energy savings). Point B (212) can be referred to as an optimal setpoint on the control curve 208, which has maximized efficiency on the control curve 208 for 50% load or the most frequent partial load. Point A (210) represents a design point which can be used for selection purposes for a particular system, and may represent a maximum expected load requirement of a given system. Note that, in some example embodiments, there may be actually increased efficiency at part load for point B versus point A. Point C (214) represents a minimum flow and head (Hmin), based on 40% of the full design head, as a default, for example. Other examples may use a different value, depending on the system requirements. The control curve 208 may also include an illustrated thicker portion 216 which represents a typical expected load range (e.g. on or about 90%-95% of a projected load range for a projected design day). Accordingly, the range of operation 202 may be optimized for partial load operation. In some example embodiments, the control curve 208 may be re-calculated or redefined based on changes to the load profile 400 (FIG. 4) of the system, either automatically or manually. The curve thicker portion 216 may also change with the control curve 208 based on changes to the load profile 400 (FIG. 4).

Figure 5:
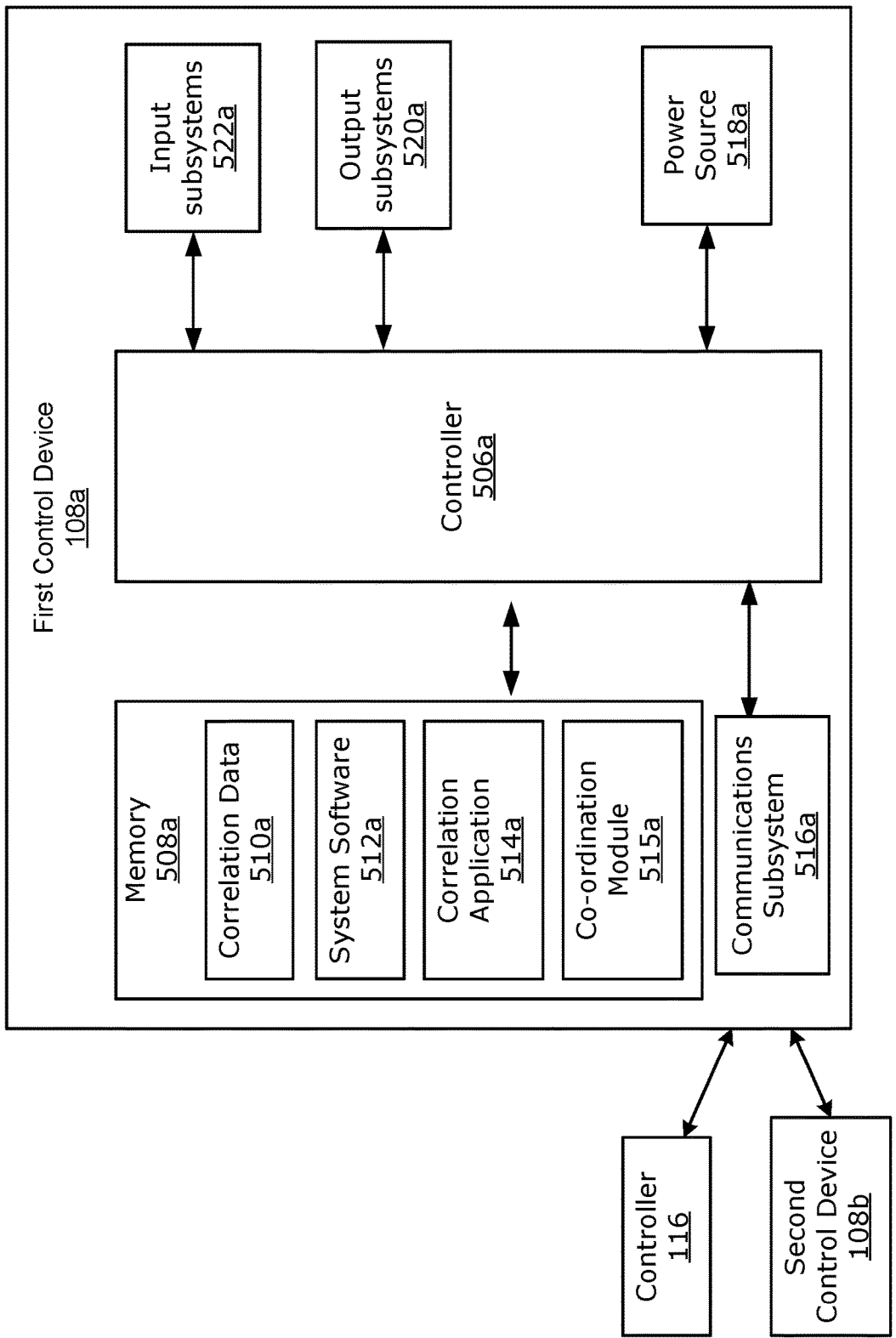
FIG. 5 illustrates an example detailed block diagram of a control device, in accordance with an example embodiment.

FIG. 5 illustrates an example detailed block diagram of the first control device 108a, for controlling the first control pump 102a (FIG. 1), in accordance with an example embodiment. The first control device 108a may include one or more controllers 506a such as a processor or microprocessor, which controls the overall operation of the control pump 102a. The control device 108a may communicate with other external controllers 116 or other control devices (one shown, referred to as second control device 108b) to co-ordinate the controlled aggregate output properties 114 of the control pumps 102 (FIG. 1). The controller 506a interacts with other device components such as memory 508a, system software 512a stored in the memory 508a for executing applications, input subsystems 522a, output subsystems 520a, and a communications subsystem 516a. A power source 518a powers the control device 108a. The second control device 108b may have the same, more, or less, blocks or modules as the first control device 108a, as appropriate. The second control device 108b is associated with a second device such as second control pump 102b (FIG. 1).

The communications subsystem 516a is configured to communicate with, either directly or indirectly, the other controller 116 and/or the second control device 108b. The communications subsystem 516a may further be configured for wireless communication. The communications subsystem 516a may be configured to communicate over a network such as a Local Area Network (LAN), wireless (Wi-Fi) network, and/or the Internet. These communications can be used to co-ordinate the operation of the control pumps 102 (FIG. 1).

The input subsystems 522a can receive input variables. Input variables can include, for example, the detector 304 (FIG. 3) for detecting device properties such as power and speed (P, S) of the motor. Other example inputs may also be used. The output subsystems 520a can control output variables, for example one or more operable elements of the control pump 102a. For example, the output subsystems 520a may be configured to control at least the speed of the motor of the control pump 102a in order to achieve a resultant desired output setpoint for head and flow (H, F), for example to operate the control pump 102 onto the control curve 208 (FIG. 2). Other example outputs variables, operable elements, and device properties may also be controlled.

In some example embodiments, the control device 108a may store data in the memory 508a, such as correlation data 510a. The correlation data 510a may include correlation information, for example, to correlate or infer between the input variables and the resultant output properties. The correlation data 510a may include, for example, the program map 302 (FIG. 3) which can map the power and speed to the resultant flow and head at the pump 102, resulting in the desired pressure setpoint at the load output. In other example embodiments, the correlation data 510a may be in the form of a table, model, equation, calculation, inference algorithm, or other suitable forms.

The memory 508a may also store other data, such as the load profile 400 (FIG. 4) for the measured "design day" or average annual load. The memory 508a may also store other information pertinent to the system or building 104 (FIG. 1).

In some example embodiments, the correlation data 510a stores the correlation information for some or all of the other devices 102, such as the second control pump 102b (FIG. 1).

Referring still to FIG. 5, the control device 108a includes one or more program applications. In some example embodiments, the control device 108a includes a correlation application 514a or inference application, which receives the input variables (e.g. power and speed) and determines or infers, based from the correlation data 510a, the resultant output properties (e.g. flow and head) at the pump 102a. In some example embodiments, the control device 108a includes a co-ordination module 515a, which can be configured to receive the determined individual output properties from the second control device 108b, and configured to logically co-ordinate each of the control devices 108a, 108b, and provide commands or instructions to control each of the output subsystems 520a, 520b and resultant output properties in a co-ordinated manner, to achieve a specified output setpoint of the output properties 114.

In some example embodiments, some or all of the correlation application 514a and/or the co-ordination module 515a may alternatively be part of the external controller 116.

In some example embodiments, in an example mode of operation, the control device 108a is configured to receive the input variables from its input subsystem 522a, and send such information as detection data (e.g. uncorrelated measured data) over the communications subsystem 516a to the other controller 116 or to the second control device 108b, for off-device processing which then correlates the detection data to the corresponding output properties. The off-device processing may also determine the aggregate output properties of all of the control devices 108a, 108b, for example to output properties 114 of a common load. The control device 108a may then receive instructions or commands through the communications subsystem 516a on how to control the output subsystems 520a, for example to control the local device properties or operable elements.

In some example embodiments, in another example mode of operation, the control device 108a is configured to receive input variables of the second control device 108b, either from the second control device 108b or the other controller 116, as detection data (e.g. uncorrelated measured data) through the communications system 516a. The control device 108a may also self-detect its own input variables from the input subsystem 522a. The correlation application 514a may then be used to correlate the detection data of all of the control devices 108a, 108b to their corresponding output properties. In some example embodiments, the co-ordination module 515a may determine the aggregate output properties for all of the control devices 108a, 108b, for example to the output properties 114 of a common load. The control device 108a may then send instructions or commands through the communications subsystem 516a to the other controller 116 or the second control device 108b, on how the second control device 108b is to control its output subsystems, for example to control its particular local device properties. The control device 108a may also control its own output subsystems 520a, for example to control its own device properties to the first control pump 102a (FIG. 1).

In some other example embodiments, the control device 108a first maps the detection data to the output properties and sends the data as correlated data (e.g. inferred data). Similarly, the control device 108a can be configured to receive data as correlated data (e.g. inferred data), which has been mapped to the output properties by the second control device 108b, rather than merely receiving the detection data. The correlated data may then be co-ordinated to control each of the control devices 108a, 108b.

Referring again to FIG. 1, the speed of each of the control pumps 102 can be controlled to achieve or maintain the inferred remote pressure constant by achieving or maintaining $H=H1+(HD-H1)*(Q/QD)^2$ (hereinafter Equation 1), wherein H is the inferred local pressure, H1 is the remote pressure setpoint, HD is the local pressure at design conditions, Q is the inferred total flow and QD is the total flow at design conditions. In example embodiments, the number of pumps running (N) is increased when $H<HD*(Q/QD))^2*(N+0.5+k)$ (hereinafter Equation 2), and decreased if $H>HD*(Q/QD))^2*(N-0.5-k2)$ (hereinafter Equation 3), where k and k2 constants to ensure a deadband around the sequencing threshold.

Figure 8:
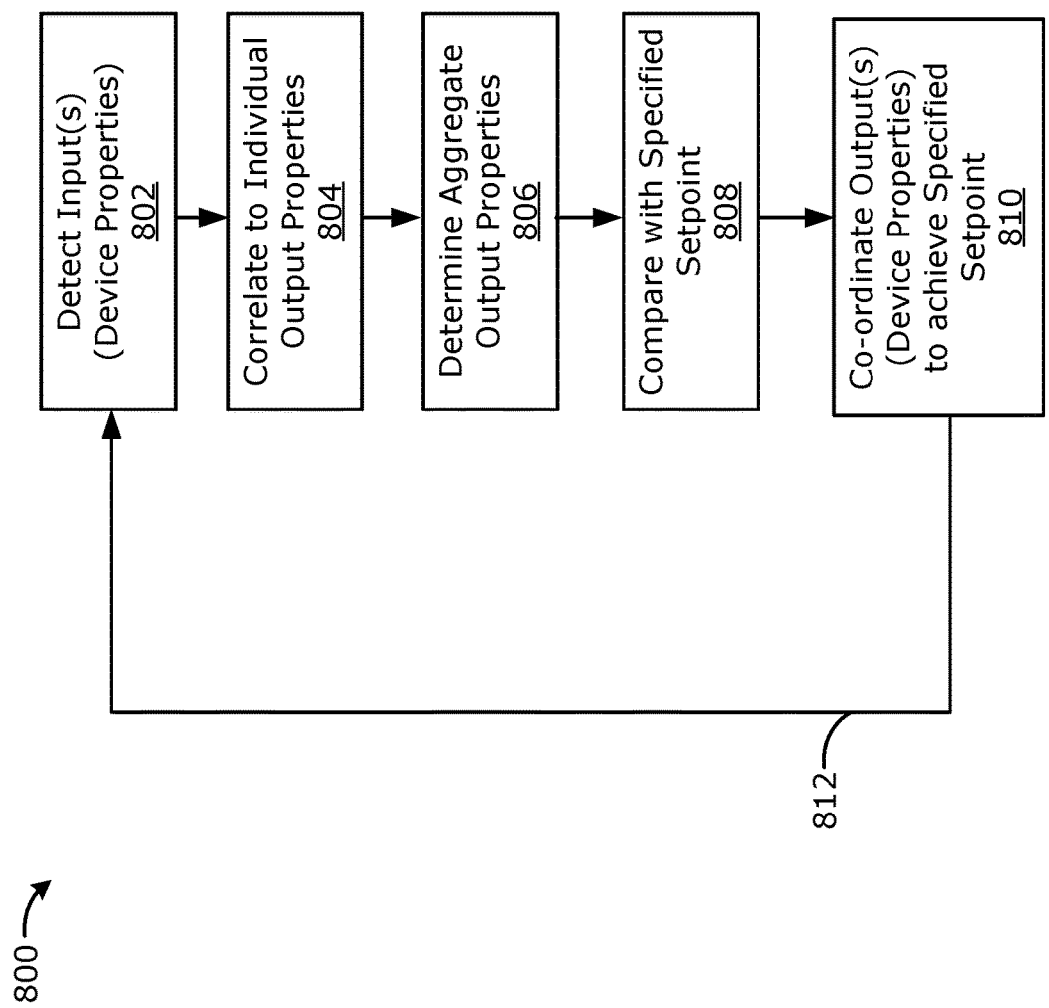
FIG. 8 illustrates a flow diagram of an example method for co-ordinating control of devices, in accordance with an example embodiment.

Reference is now made to FIG. 8, which illustrates a flow diagram of an example method 800 for co-ordinating control of two or more control devices, in accordance with an example embodiment. The devices each include a communication subsystem and are configured to self-detect one or more device properties, the device properties resulting in output having one or more output properties. At event 802, the method 800 includes detecting inputs including the one or more device properties of each device. At event 804, the method 800 includes correlating, for each device, the detected one or more device properties to the one or more output properties, at each respective device. The respective one or more output properties can then be calculated to determine their individual contributions to a system load point. At event 806, the method 800 includes determining the aggregate output properties to the load from the individual one or more output properties. At event 808, the method 800 includes comparing the determined aggregate output properties 114 with a setpoint, such as a pressure setpoint at the load. For example, it may be determined that one or more of the determined aggregate output properties are greater than, less than, or properly maintained at the setpoint. For example, this control may be performed using Equation 1, as detailed above. At event 810, the method includes co-ordinating control of each of the devices to operate the respective one or more device properties to co-ordinate the respective one or more output properties to achieve the setpoint. This may include increasing, decreasing, or maintaining the respective one or more device properties in response, for example to a point on the control curve 208 (FIG. 2). The method 800 may be repeated, for example, as indicated by the feedback loop 812. The method 800 can be automated in that manual control would not be required.

In another example embodiment, the method 800 may include a decision to turn on or turn off one or more of the control pumps 102, based on predetermined criteria. For example, the decision may be made using Equation 2 and Equation 3, as detailed above.

While the method 800 illustrated in FIG. 8 is represented as a feedback loop 812, in some other example embodiments each event may represent state-based operations or modules, rather than a chronological flow.

For example, referring to FIG. 1, the various events of the method 800 of FIG. 8 may be performed by the first control device 108a, the second control device 108b, and/or the external controller 116, either alone or in combination.

Figure 6:
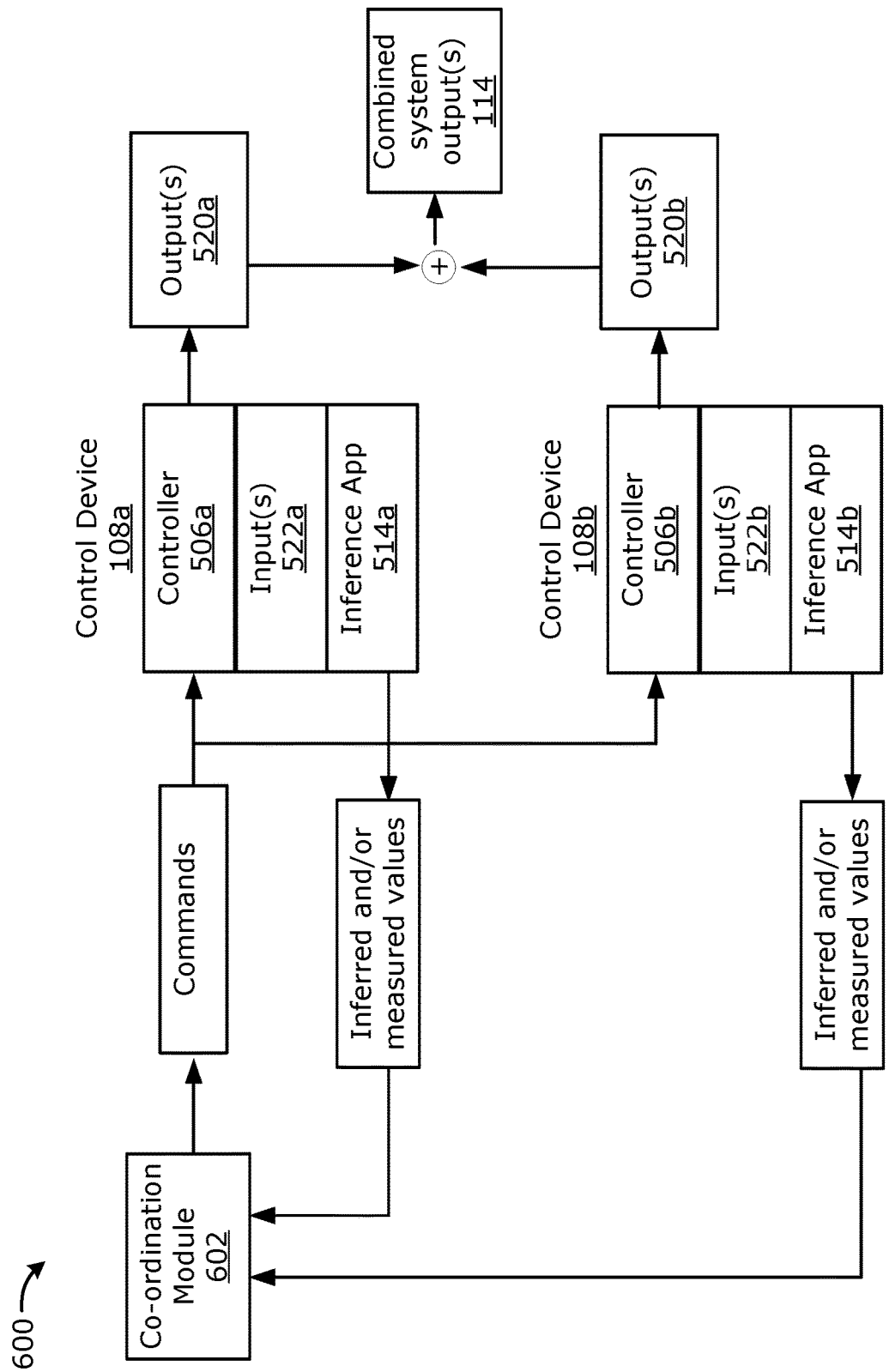
FIG. 6 illustrates a control system for co-ordinating control of devices, in accordance with an example embodiment.

Reference is now made to FIG. 6, which illustrates an example embodiment of a control system 600 for co-ordinating two or more sensorless control devices (two shown), illustrated as first control device 108a and second control device 108b. Similar reference numbers are used for convenience of reference. As shown, each control device 108a, 108b may each respectively include the controller 506a, 506b, the input subsystem 522a, 522b, and the output subsystem 520a, 520b for example to control at least one or more operable device members (not shown).

A co-ordination module 602 is shown, which may either be part of at least one of the control devices 108a, 108b, or a separate external device such as the controller 116 (FIG. 1). Similarly, the inference application 514a, 514b may either be part of at least one of the control devices 108a, 108b, or part of a separate device such as the controller 116 (FIG. 1).

In operation, the co-ordination module 602 co-ordinates the control devices 108a, 108b to produce a co-ordinated output(s). In the example embodiment shown, the control devices 108a, 108b work in parallel to satisfy a certain demand or shared load 114, and which infer the value of one or more of each device output(s) properties by indirectly inferring them from other measured input variables and/or device properties. This co-ordination is achieved by using the inference application 514a, 514b which receives the measured inputs, to calculate or infer the corresponding individual output properties at each device 102 (e.g. head and flow at each device). From those individual output properties, the individual contribution from each device 102 to the load (individually to output properties 114) can be calculated based on the system/building setup. From those individual contributions, the co-ordination module 602 estimates one or more properties of the aggregate or combined output properties 114 at the system load of all the control devices 108a, 108b. The co-ordination module 602 compares with a setpoint of the combined output properties (typically a pressure variable), and then determines how the operable elements of each control device 108a, 108b should be controlled and at what intensity.

It would be appreciated that the aggregate or combined output properties 114 may be calculated as a linear combination or a non-linear combination of the individual output properties, depending on the particular property being calculated, and to account for losses in the system, as appropriate.

In some example embodiments, when the co-ordination module 602 is part of the first control device 108a, this may be considered a master-slave configuration, wherein the first control device 108a is the master device and the second control device 108b is the slave device. In another example embodiment, the co-ordination module 602 is embedded in more of the control devices 108a, 108b than actually required, for fail safe redundancy.

Referring still to FIG. 6, some particular example controlled distributions to the output subsystems 520a, 520b will now be described in greater detail. In one example embodiment, for example when the output subsystems 520a, 520b are associated with controlling device properties of equivalent type or performance, the device properties of each control pump 102 may be controlled to have equal device properties to distribute the flow load requirements. In other example embodiments, there may be unequal distribution, for example the first control pump 102a may have a higher flow capacity than the second control pump 102b (FIG. 1). In another example embodiment, each control pump 102 may be controlled so as to best optimize the efficiency of the respective control pumps 102 at partial load, for example to maintain their respective control curves 208 (FIG. 2) or to best approach Point B (212) on the respective control curve 208.

Referring still to FIG. 6, in an optimal system running condition, each of the control devices 108a, 108b are controlled by the co-ordination module 602 to operate on their respective control curves 208 (FIG. 2) to maintain the pressure setpoint at the output properties 114. This also allows each control pump 102 to be optimized for partial load operation. For example, as an initial allocation, each of the control pumps 102 may be given a percentage flow allocation (e.g. can be 50% split between each control device 108a, 108b in this example), to determine or calculate the required initial setpoint (e.g. Point A (210), FIG. 2). The percentage responsibility of required flow for each control pump 102 can then be determined by dividing the percentage flow allocation from the inferred total output properties 114. Each of the control pumps 102 can then be controlled along their control curves 208 to increase or decrease operation of the motor or other operable element, to achieve the percentage responsibility per required flow.

However, if one of the control pumps (e.g. first control pump 102a) is determined to be underperforming or off of its control curve 208, the co-ordination module 602 may first attempt to control the first control pump 102a to operate onto its control curve 208. However, if this is not possible (e.g. damaged, underperforming, would result in outside of operation range 202, otherwise too far off control curve 208, etc.), the remaining control pumps (e.g. 102b) may be controlled to increase their device properties on their respective control curves 208 in order to achieve the pressure setpoint at the required flow at the output properties 114, to compensate for at least some of the deficiencies of the first control pump 102a. Similarly, one of the control pumps 102 may be intentionally disabled (e.g. maintenance, inspection, save operating costs, night-time conservation, etc.), with the remaining control pumps 102 being controlled accordingly.

In other example embodiments, the distribution between the output subsystems 520a, 520b may be dynamically adjusted over time so as to track and suitably distribute wear as between the control pumps 102.

Figure 7:
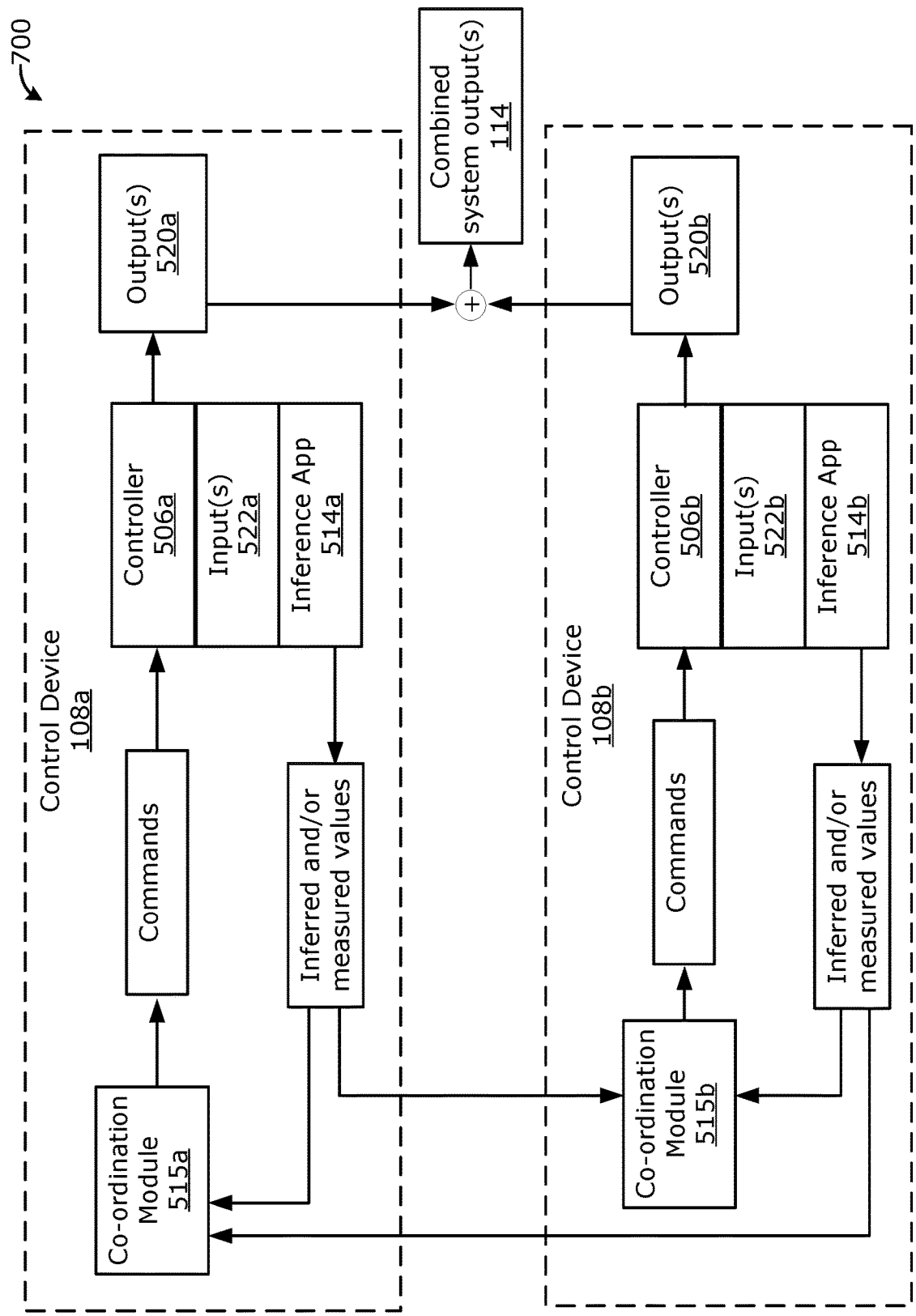
FIG. 7 illustrates another control system for co-ordinating control of devices, in accordance with another example embodiment.

Reference is now made to FIG. 7, which illustrates another example embodiment of a control system 700 for co-ordinating two or more sensorless control devices (two shown), illustrated as first control device 108a and second control device 108b. Similar reference numbers are used for convenience of reference. This may be referred to as a peer-to-peer system, in some example embodiments. An external controller 116 may not be required in such example embodiments. In the example shown, each of the first control device 108a and second control device 108b may control their own output subsystems 520a, 520b, so as to achieve a co-ordinated combined system output 114. As shown, each co-ordination module 515a, 515b is configured to each take into account the inferred and/or measured values from both of the input subsystems 522a, 522b. For example, as shown, the first co-ordination module 515a may estimate one or more output properties of the combined output properties 114 from the individual inferred and/or measured values.

As shown, the first co-ordination module 515a receives the inferred and/or measured values and calculates the individual output properties of each device 102 (e.g. head and flow). From those individual output properties, the individual contribution from each device 102 to the load (individually at output properties 114) can be calculated based on the system/building setup. The first co-ordination module 515a can then calculate or infer the aggregate output properties 114 at the load.

The first co-ordination module 515a then compares the inferred aggregate output properties 114 with a setpoint of the output properties (typically a pressure variable setpoint), and then determines the individual allocation contribution required by the first output subsystem 520a (e.g. calculating 50% of the total required contribution in this example). The first output subsystem 520a is then controlled and at a controlled intensity (e.g. increase, decrease, or maintain the speed of the motor, or other device properties), with the resultant co-ordinated output properties being again inferred by further measurements at the input subsystem 522a, 522b.

As shown in FIG. 7, the second co-ordination module 515b may be similarly configured as the first co-ordination module 515a, to consider both input subsystem 522a, 522b to control the second output subsystem 520b. For example, each of the control pumps 102 may be initially given a percentage flow allocation. Each of the control pumps 102 can then be controlled along their control curves 208 to increase or decrease operation of the motor or other operable element, based on the aggregate load output properties 114. The aggregate load output properties 114 may be used to calculate per control pump 102, the require flow and corresponding motor speed (e.g. to maintain the percentage flow, e.g. 50% for each output subsystem 520a, 520b in this example). Accordingly, both of the co-ordination modules 515a, 515b operate together to co-ordinate their respective output subsystems 520a, 520b to achieve the selected output setpoint at the load output properties 114.

As shown in FIG. 7, note that in some example embodiments each of the co-ordination modules 515a, 515b are not necessarily in communication with each other in order to functionally operate in co-ordination. In other example embodiments, not shown, the co-ordination modules 515a, 515b are in communication with each other for additional co-ordination there between.

Although example embodiments have been primarily described with respect to the control devices being arranged in parallel, it would be appreciated that other arrangements may be implemented. For example, in some example embodiments the controlled devices can be arranged in series, for example for a pipeline, booster, or other such application. The resultant output properties are still co-ordinated in such example embodiments. For example, the output setpoint and output properties for the load may be the located at the end of the series. The control of the output subsystems, device properties, and operable elements are still performed in a co-ordinated manner in such example embodiments. In some example embodiments the control devices can be arranged in a combination of series and parallel.

Figure 9:
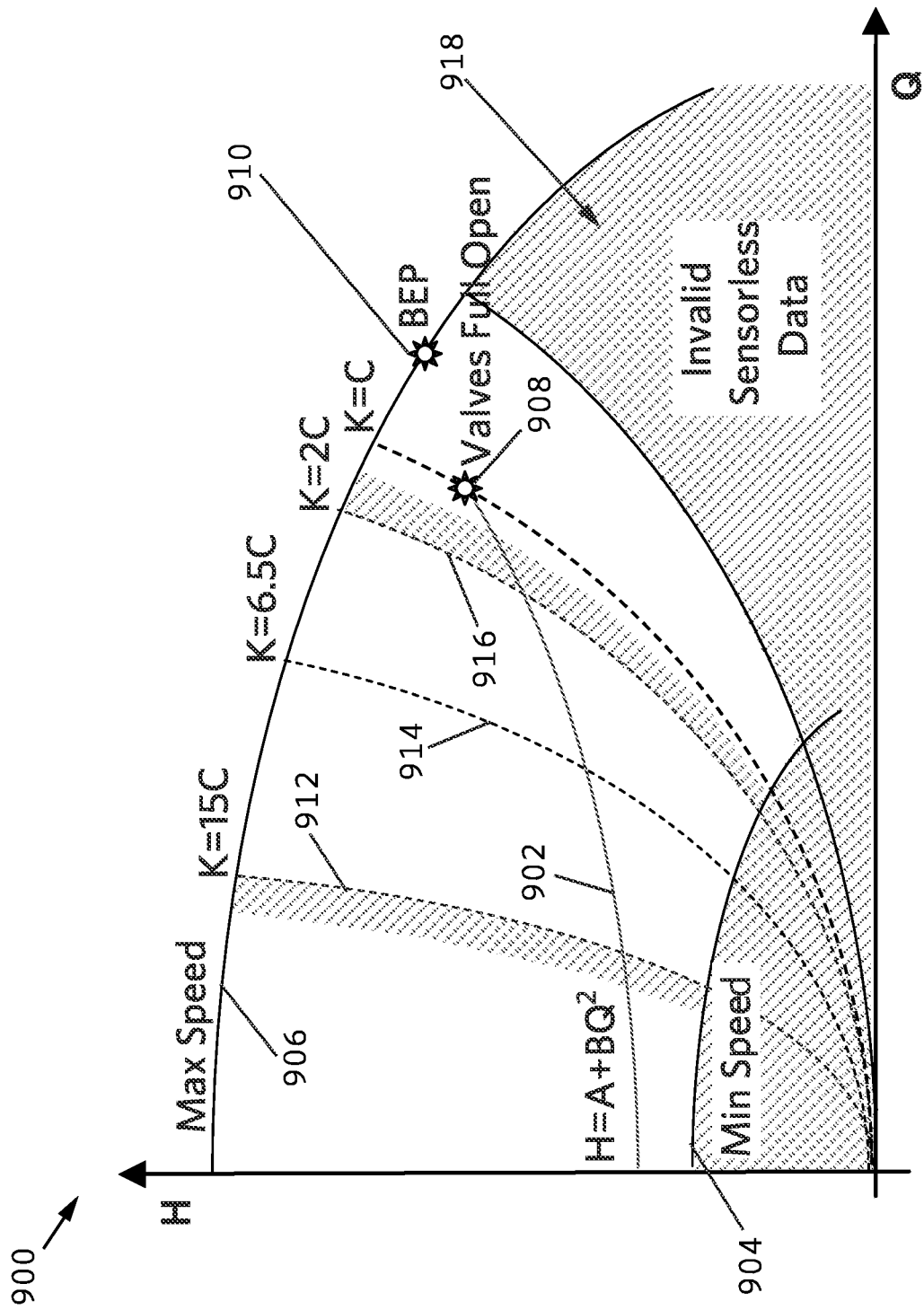
FIG. 9 illustrates an example operation graph of a variable speed control pump, having an adjustable control curve which uses detected system hydraulic resistance for energy consumption optimization, in accordance with an example embodiment.

Reference is now made to FIG. 9, which illustrates an example operation graph 900 of head versus flow for a variable speed control pump 102 (FIG. 1), in accordance with an example embodiment. Generally, the operation graph 900 illustrates an adjustable control curve 902 which is used to optimize a system hydraulic resistance ($K=H/Q^2$) of e.g. the circulating system 100 of FIG. 1. System hydraulic resistance is also referred to as hydraulic conductivity.

Referring therefore to FIG. 1, one or more controllers such as control device 108 and/or external controller 116 may be used to dynamically determine or calculate the control curve 902 (FIG. 9) in real-time during runtime operation of the circulating system 100. Generally, the controller automatically update or adjust the model or parameters of the control pump 102, to adjust the control curve 902 (FIG. 9) to compensate for flow loss or other changes which may occur in conditions of the system 100. The controller is self-learning in that at least some of the initial and subsequent parameters of the system 100 are determined automatically, i.e., would not require manual configuration. The control pump 102 is controlled using data collected during runtime. The control pump 102 is controlled in order to reduce pump energy consumption without compromising system stability or starving the load(s) 110a, 110b, 110c, 110d.

In some example embodiments, the control pumps 102 can be sensorless in the sense that they can be used to determine or calculate the system resistance without an external sensor. This is performed by having the control pump 102 self-detect its own device properties such as power and speed, and inferring or correlating the resultant head and flow, as described in detail above with respect to FIG. 3. The present system resistance can then be calculated as $K=H/Q^2$.

Still referring to FIG. 1, the control pump 102 can distribute a hot or chilled fluid to one or more loads 110a, 110b, 110c, 110d, which control the flow they take using modulating valves 112a, 112b, 112c, 112d, or in some example embodiments there are sufficient loads with on/off valves that the system 100 can be treated as modulating. As shown in FIG. 9, the pump speed can be set at any value between a minimum speed 904 and a maximum speed 906 which depends on the pump-motor-drive set. In the example shown in FIG. 9, the system design point 908 represents the "design" flow and head of the system 100, which may be initially unknown and may change over time. It is presumed that the system design point 908 is lower or equal to the pump best efficiency point, BEP 910, for flow and head, based on suitable pump selection. In operation, the pump speed is adjusted using a flow loss compensation algorithm with a quadratic control curve: Head=A+B×Flow², as shown. Higher order polynomials may also be used, in other example embodiments. In some example embodiments, it can be presumed that the system load is no more than 40% asymmetrical; that is, at any time the maximum percent flow demand from a load cannot be more than 40% higher than that of the less demanding load. In some example embodiments, it may also be presumed that the valves 112a, 112b, 112c, 112d have approximately equal percentage curves.

Referring again to FIG. 9, operation using a single control pump 102 will be described for ease of illustration, although it can be appreciated that more than one control pump 102 may be operated within the system 100. Generally, the example embodiment of FIG. 9 operates to keep the valves 112a, 112b, 112c, 112d as open as possible, in order to minimize the kinetic (pump) energy dissipated by them. This is performed in a controlled manner, to prevent the system from not being able to provide enough flow when the valves 112a, 112b, 112c, 112d are full open.

For example, the control pump 102 can be controlled to slowly adjust the control curve 902 such that the valves will operate most of the time between 60% and 90% open, and half of the time on each side of 75% open. The average valve opening is detected by calculating the average system resistance $K=H/Q^2$. An invalid zone 918 represents a right boundary outside of the range of operation of the control pump 102. Other boundaries may be provided or defined for the range of operation of the control pump 102.

The following relationship was established by analyzing different valve brands curves (KFO is the resistance when the valve is full open):

| Position (%) | K/KFO |
| --- | --- |
| 40 | 44 |
| 60 | 15 |
| 75 | 6.5 |
| 90 | 2 |
| 100 | 1 |

The value of K is monitored and the following four situations cause the control curve parameters (A and B) to be adjusted: 1) valves are too open (K<2 KFO): right side of the curve is raised; 2) valves are too closed (K>15KFO): left side of the curve is lowered; 3) valves are most of the time open less than 75%: the curve is lowered; 4) valves are most of the time open more than 75%: the curve is raised. For items 3) or 4), other suitable percentage values can range from 50% to 100%.

Figure 10A:
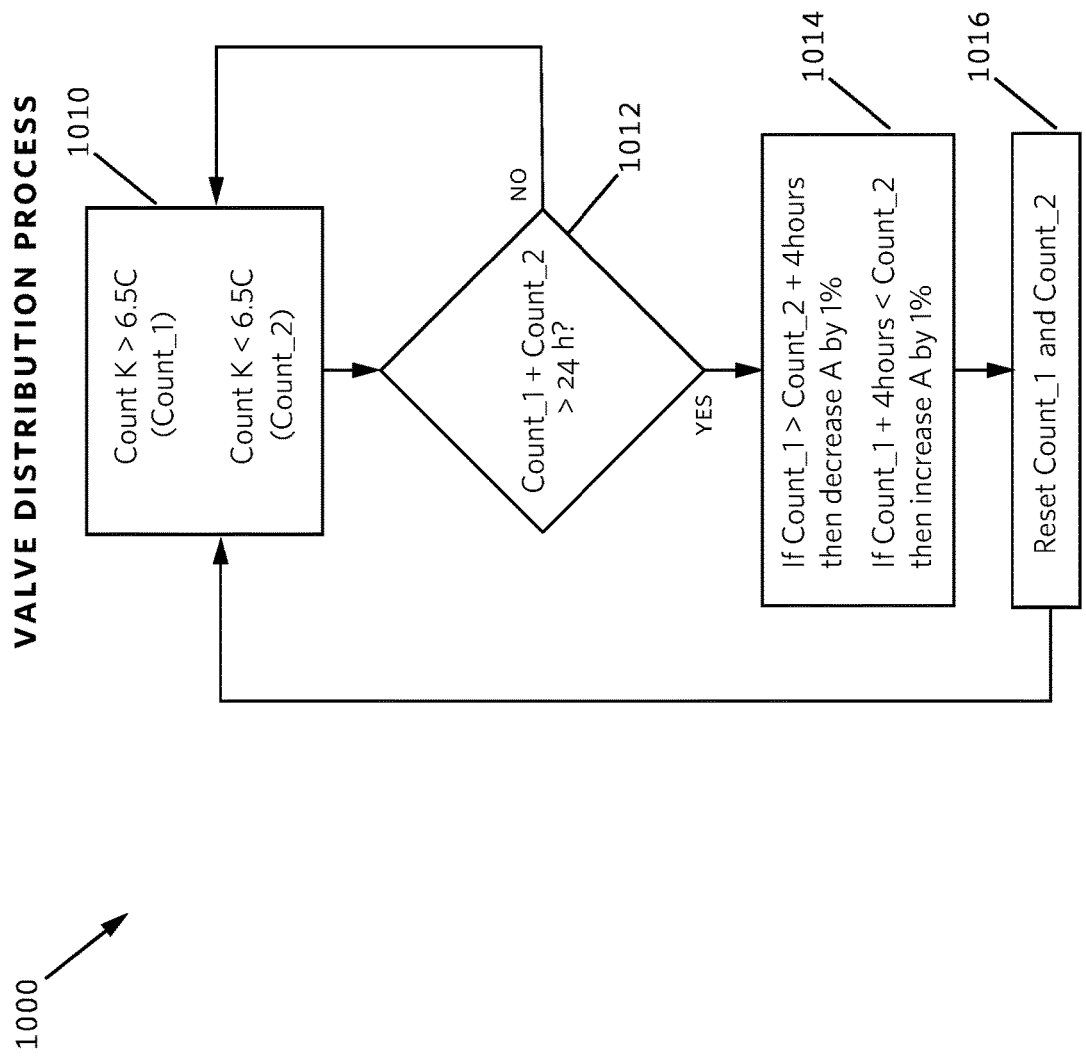
Figure 10C:
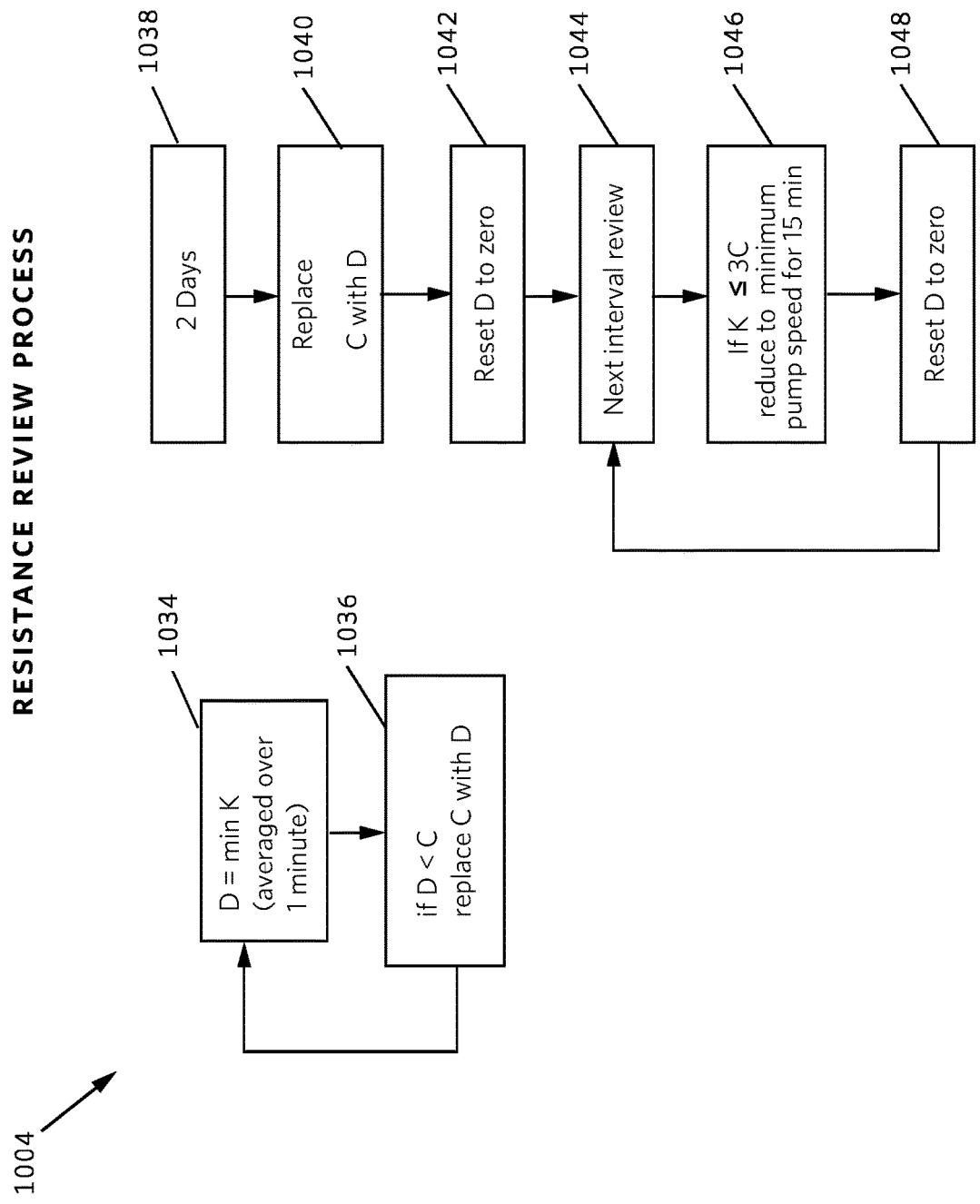

Reference is now made to FIGS. 10A, 10B and 10C, which illustrate example flow diagrams for adjusting the control curve 902 of FIG. 9, in accordance with example embodiments. As shown, these algorithms are referred to as valve distribution process 1000 (FIG. 10A), valve position process 1002 (FIG. 10B), and resistance review process 1004 (FIG. 10C), respectively. In example embodiments, some or all of the processes 1000, 1002, 1004 may be performed simultaneously during runtime operation of the control pump 102 on the system 100. In some example embodiments, the processes 1000, 1002, 1004 can be performed during initial setup of the system 100 as well as during operation.

Initially, with reference to the control curve 902 of FIG. 9, the following parameters can be initialized, which initially references the BEP 910 for the initial system resistance (valves full open):

$A=Z\times BEP\_Head, (Z=0-10);$ $B=(BEP\_Head-A)/BEP\_Flow^2;$ and $C=BEP\_Head/BEP\_Flow^2$ (when all valves full open).

The various system resistance curves are shown on the graph 900, for example K=15C (912), K=6.5C (914), and K=2C (916). The system design point 908 and control curve 902 can be dynamically determined in real time, without having special knowledge of the system resistance. The system resistance can change due to flow losses and other factors. As mentioned, some or all of the processes 1000, 1002, 1004 may be performed simultaneously to adjust the control curve 902.

Referring to FIG. 10A, the valve distribution process 1000 determines whether the valves are most of the time open less than 75%, and the curve is lowered in response. The valve distribution process 1000 also determines whether the valves are most of the time open more than 75%, and the curve is raised in response.

At event 1010, calculate or infer $K=H/Q^2$ and count the time K is greater than 6.5C (Count_1) and the time K is less than 6.5C (Count_2). As in the above table, recall that 6.5C corresponds to the valves being 75% open.

At event 1012, it is determined whether 24 hours has passed for counting the times for K, e.g. if Count_1+Count_2>24 hours (the pump has been running more than 24 hours since the last check). If 24 hours has passed, then at event 1014: if Count_1>Count_2+4 hs then decrease A by 1%; if Count_1+4 hs<Count_2 then increase A by 1%. Otherwise, A is maintained. At event 1014, reset Count_1 to 0 and Count_2 to 0. The method 1000 then repeats to step 1010 for the next 24 hour interval.

Referring now to FIG. 10B, the valve position process 1002 determines whether the valves are too open (K<2 KFO), and the right side of the curve is raised in response. The valve position process 1002 also determines whether the valves are too closed (K>15KFO), and the left side of the curve is lowered in response.

At event 1020, calculate $K=H/Q^2$. At event 1022, when K stays above 15C, every 30 minutes decrease A by 5% and increase B by 5%. At event 1024, when K stays below 2C, every 30 minutes decrease A by 5% and increase B by 5%. The method 1002 then repeats to event 1020.

Referring to FIG. 10C the resistance review process 1004 is used to periodically determine or review the minimum system resistance, when the valves are fully open. At event 1034, the minimum value of K averaged over 1 min achieved (D) is determined and stored. At event 1036, at any time if D<C, replace C with D.

At event 1038, after the first 2 days of operation (e.g. after the initial setup), C is replaced with D (event 1040). At event 1042, D is reset to zero. At event 1044, after the initial setup interval, different "review intervals" may be used. For example, review intervals can be given by the following: 1) first interval is 2 days after the initial 2 days of operation; 2) second interval is 4 days thereafter; 3) third interval is 8 days therafter; 4) fourth interval is 16 days thereafter; each subsequent interval is 16 days thereafter for the indefinite runtime duration of the system. Other suitable intervals can range from 1 to 30 days.

After every "review interval" is completed (event 1044), at event 1046, if K<3C, reduce speed to the minimum pump speed (e.g. default 30%) for 15 minutes. This essentially forces the valves to be fully open. Note that, event 1036 will trigger if D<C at this stage, such that C is replaced with D. At event 1048, reset D to zero and then loop to start a new review interval at event 1044.

Note that, the example embodiments of FIGS. 10A to 10C may further be limited by the range of operation of the operation graph 900 (FIG. 9). For example, the control curve 902 cannot be adjusted using those methods to fall outside of the range of operation. Any values or ranges provided are intended be illustrative, and can be on or about those values or ranges, or other suitable values or ranges.

Figure 11:
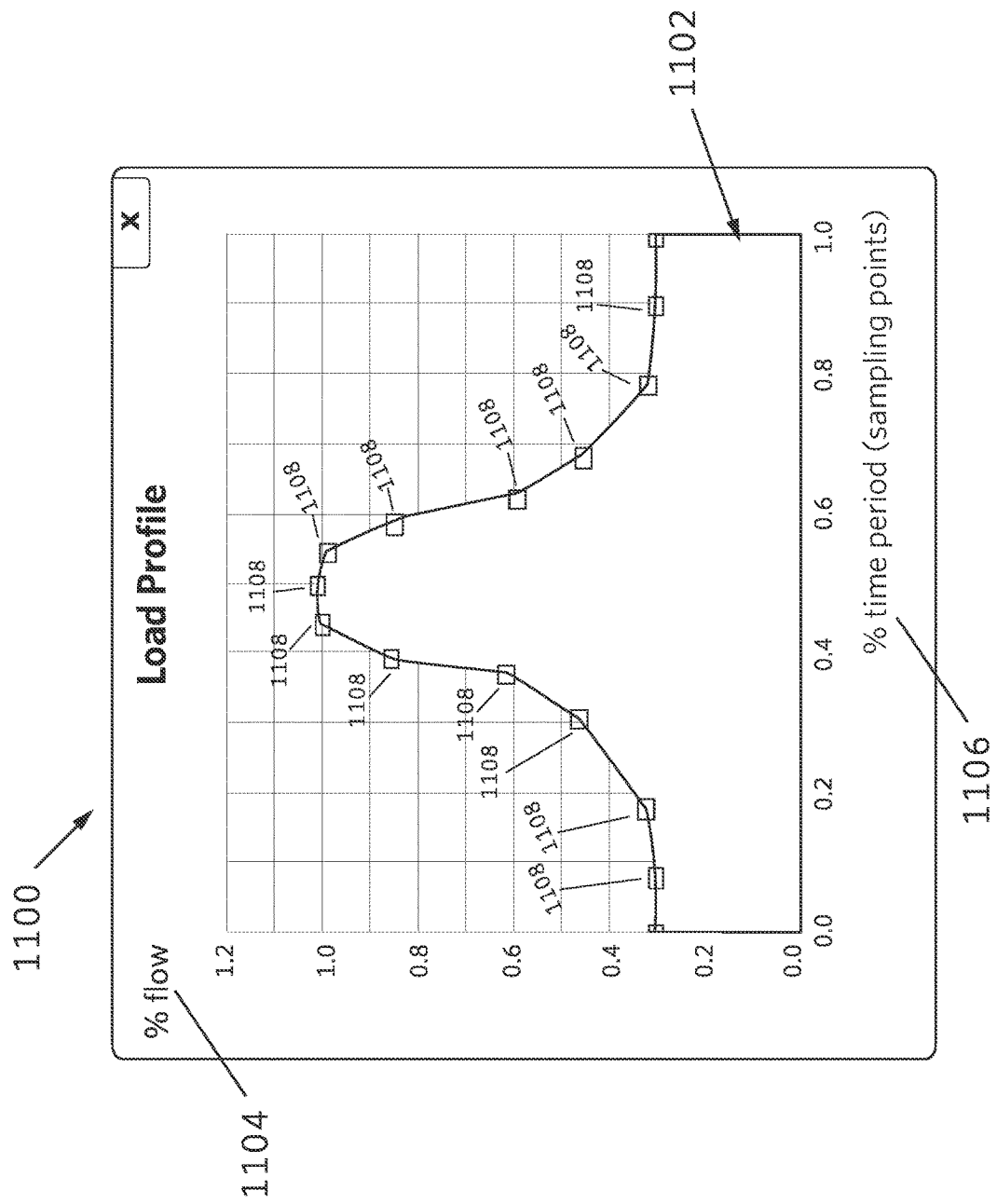
FIG. 11 illustrates an example adjustable load profile for a system, which can be used to adjust a control curve of FIG. 2, in accordance with another example embodiment.

Reference is now made to FIG. 11, in the context of FIG. 2, which illustrates optimizing of pump efficiency in accordance with an example embodiment. With reference to FIG. 2, the control curve 202 may be adjusted or controlled in real-time in dependence of a detected (measured or inferred)

load of the system 100. Typically, the load flow of the system 100 is tracked in real-time to dynamically update a load profile 1100.

As an initial conceptual matter, the load profile 1100 of FIG. 11 may be implemented as a graphical user interface (GUI) screen 1100 for configuring the load profile 1102 of the building 104. The load profile 1102 is normalized to one (100%) in this example representation. The load profile 1102 represents a projected or measured percentage flow 1104 for specified time periods 1106, with the percentage flow being across e.g. a "design day". The interface screen 1100 is initially presented with a default load profile 1102, as shown. A building designer (user) may wish to configure the load profile to the particular building 104 to something other than the default load profile. As shown, in some example embodiments, the user may select particular sampling points 1108 of the load profile 1102 on the interface screen 1100, and drag those points 1108 to different flow 1104 and time periods 1106, in order to adjust the default load profile to the desired particular projected or measured flow profile of the actual system or building 104. In other example embodiments, the building designer may input specific flow 1104 and time periods 1106 for the particular points 1108 by inputting into a field-based interface (not shown), or by uploading a suitably configured file which provides these values. In other example embodiments, the axes of the load profile 1102 instead may be equivalent to those shown in FIG. 4.

An automated system for updating the load profile 1102 will now be described, rather than the just-described manual user interface. The load profile 1102 may be an initial default load profile. With reference now to FIGS. 1 and 2, one or more controllers such as control device 108 and/or external controller 116 may be used to dynamically determine or calculate the control curve 208 in real-time during operation. Generally, the controller automatically adjust the model or parameters of the control pump 102, to adjust the control curve 208 to compensate for changes in the design day or load profile 1102. The control pump 102 is controlled using data collected during run time. The control pump 102 is controlled in order to optimize pump efficiency without compromising system stability and to maintain compliance with ASHRAE 90.1.

For the control curve 208, with reference again to FIG. 2, the illustrated thicker portion 216 may be dynamically adjusted with reference to the updated load profile 1102 (FIG. 11). The control curve 208 can also be dynamically updated in dependence of the updated load profile 1102. The intelligent variable speed device would operate along the dynamically changing control curve 208, which has been updated in real time during runtime.

For example, point A (210), point B (212), and point C (214) would be updated accordingly depending on the detected or inferred load profile 1102. For example, the control curve 208 may be updated so that the most frequent or average load represented as point B (212), is as close to the BEP curve 220 as possible. Although point B (212) may be initially 50% of peak load, it may be dynamically determined (measured or inferred) that the load profile 1102 is asymmetric or has some other peak load. In response, the control curve 208 may involve adjusting or re-calculating point A (210) and/or point C (214), e.g. from the initial default settings. In an example embodiment, if it is determined that point B (212) is to the left of the BEP curve 220, in response point A (210) is moved to the right a specified amount (e.g. 1-10%) every specified interval (e.g. 1 to 365 days). If it is determined that point B (212) is to the right of the BEP curve 220, in response point A (210) is moved to the left a specified amount (e.g. 1-10%) every specified interval. In an example embodiment, if it is determined that point B (212) is on top of the BEP curve 220, in response point A (210) and/or point C (214) are moved downwardly a specified amount (e.g. 1-10%) every specified interval. If it is determined that point B (212) is under the BEP curve 220, in response point A (210) and/or point C (214) are moved upwardly a specified amount (e.g. 1-10%) every specified interval.

In some example embodiments, the control pumps 102 are sensorless in that they can be used to determine or calculate the required flow load without an external sensor. This is performed by having the control pump 102 self-detect the device properties such as power and speed, and inferring or correlating the resultant head and flow, as described in detail above with respect to FIG. 3.

Figure 12:
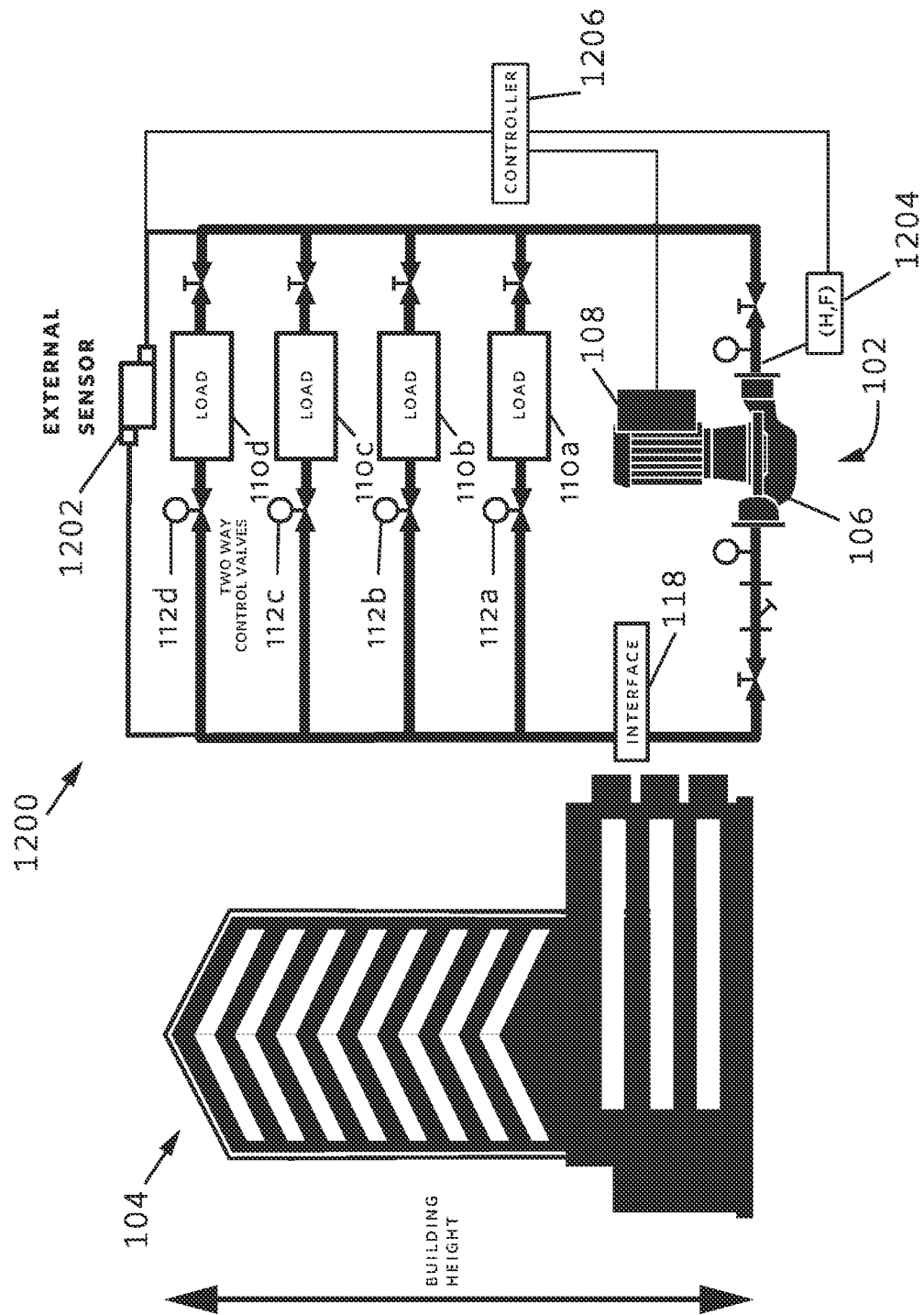
FIG. 12 illustrates an example block diagram of a circulating system having external sensors, in accordance with an example embodiment.

FIG. 12 illustrates an example block diagram of a circulating system 1200 having external sensors, in accordance with another example embodiment. Similar references numerals as FIG. 1 are used for convenience of reference. Although the above exemplary embodiments of FIGS. 9, 10A, 10B, 10C and 11 have been primarily described in the context of sensorless devices, in some other example embodiments it may be appropriate to use external sensors. The system 1200 includes an external sensor 1202 which can be used to detect, for example, the pressure and flow. Another sensor 1204 can be used to detect, for example, the head and flow output from the device 102. A controller 1206 may be in communication one or both of the sensors 1202, 1204 in order to receive and track the sensor measurements, and control operation of the control pump(s) 102. Accordingly, any calculation in the embodiments described with respect to FIGS. 9 to 11 which require correlating or inferring a pressure or head from the device properties can instead be determined using information measured by one or both of the sensors 1202, 1204. For example, the embodiments illustrated in FIGS. 9, 10A, 10B, 10C and 11 may be configured with external sensors, depending on the particular application.

Figure 13:
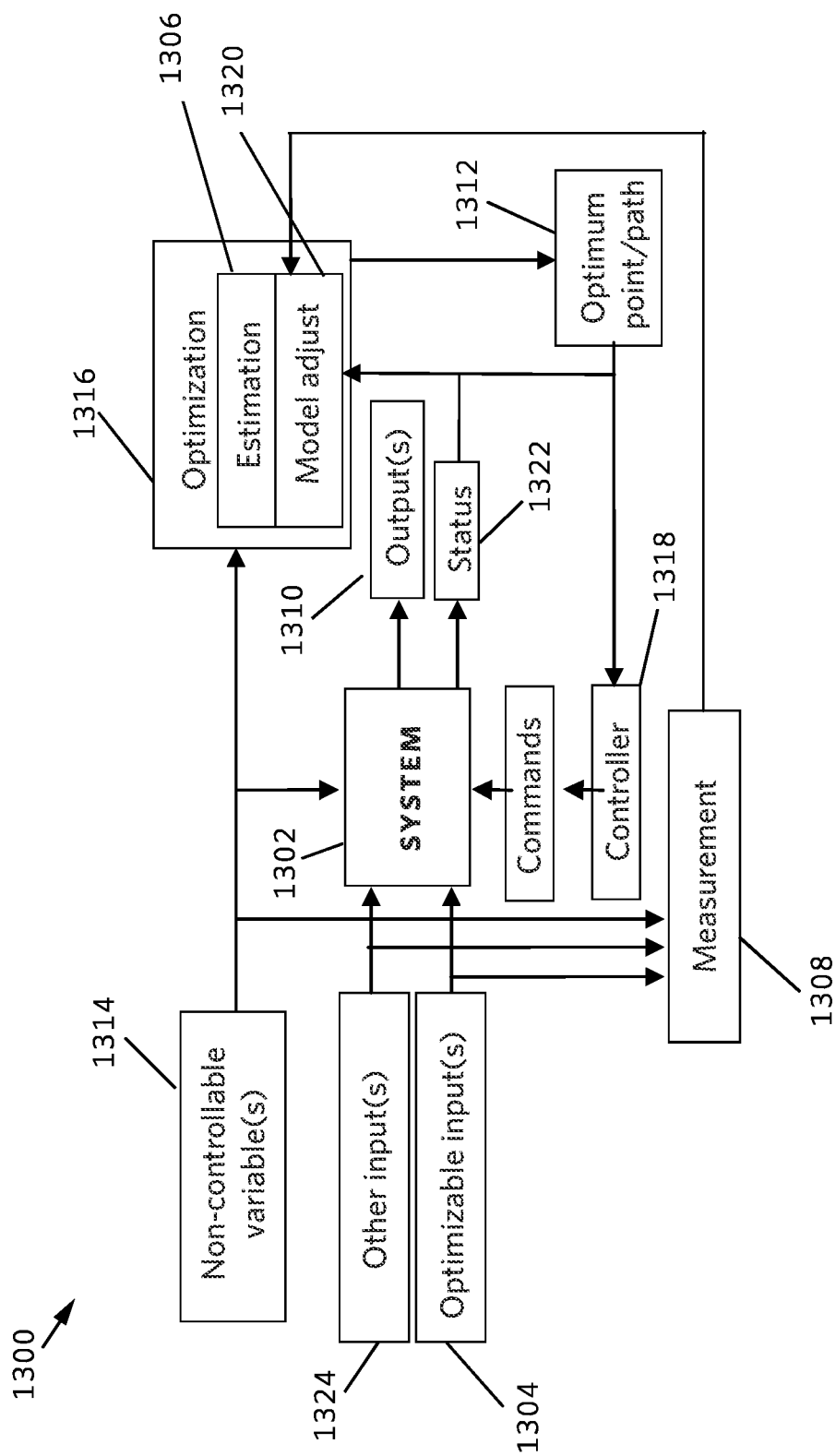
FIG. 13 illustrates an example flow control system for a flow system, in accordance with an example embodiment.

FIG. 13 illustrates an example control system 1300 for controlling an operable system 1302, in accordance with an example embodiment. Generally, in the control system 1300, outputs 1310 and inputs including optimizable inputs 1304 are measured and an estimation method 1306 or algorithm is updated or adjusted for the system 1302. In some example embodiments, the control system 1300 includes continuous feedback loop(s) which operate during initial setup as well as indefinite runtime of the system 1302 (continuously or at discrete times). In some example embodiments, no or little prior knowledge of the system 1302 is required. Rather, the control system 1300 controls and adapts its performance and control models based on self-learning of the system 1302. In some example embodiments, the system 1302 can be e.g. the circulating system 100 illustrated in FIG. 1, or the circulating system 1200 illustrated in FIG. 12.

The system 1302 produces certain output(s) 1310 characterized by one of more variables (e.g. flow, temperature, viscosity, thickness, speed, thermal energy, items per minute, distance, etc), composed of several parts whose operation points/path can be characterized by a finite number of continuous or discrete variables (e.g. speed, temperature, power, run status, rpm, mode of operation, gear, breaks position, etc).

These continuous or discrete variables work together to produce the output(s) 1310 of the system 1302 and interact in such a way that the operation point/path of one output variable determines or restricts the operation points of the other output variables. There may also be restrictions to the operation of each part, i.e., limited range(s) for the values its operation point characterizing variable(s) can take. These continuous or discrete variables variable(s) may include device properties of controllable operable element(s), e.g. a pump motor.

The system 1302 includes input variable(s), which may include non-controllable variable(s) 1314 which are externally determined and cannot be controlled (e.g. outdoor temperature, commodities prices, output demand, etc), that affect the operation of the system parts or should be taken into account when deciding how to operate the system 1302 efficiently. The system 1302 includes input variables such as optimizable input(s) 1304 which can be optimized. Example optimizable input(s) 1304 may be consumable inputs, e.g., energy, chemicals, water, money or time. Other input variables 1324 may also be input into the system 1302. As shown, the input variables can be measured using measurement 1308 in order to adjust a parameter of, determine, or calculate the appropriate model by the model adjust module 1320. Various input variables can include consumable inputs (energy, chemicals, etc) or other inputs (outdoor temperature, demand, speed, line voltage, etc).

In the system 1302, there is more than one operation point or path that can give a desired output 1310. The control system 1300 is configured to produce the required output 1310 (to satisfy the output demand) optimizing the use of one or more of the optimizable inputs 1304 required to produce that output 1310.

In some example embodiments, there is provided a method or model for each part of the system 1302, such as e.g. formula(s), table(s), or algorithm, to predict the amount the system 1302 uses the optimizable inputs 1304, for all the points of operation in its allowed range. An optimum point/path 1312 is then determined and updated by the estimation method 1306.

The system operation point or system status 1322 is given by all of the characterizing variables of the system parts, reduced by the restrictions imposed by the interaction or interconnection of the variables, and limited in range by the parts operational restrictions.

For each system allowed operation point, the amount of optimizable inputs 1304 the system 1302 would consume can be calculated as the sum of the amounts consumed by each of its parts. The system controllable variables are its characterizing variables minus those externally determined non-controllable variable(s) 1314.

As shown in FIG. 13, in example embodiments, given the non-controllable variable(s) 1314 (the conditions in which the system has to work), the optimization module 1316 uses the estimation method 1306 to find an optimum point or path 1312 compatible with the given conditions, then the system 1302 is commanded by the controller module 1318 to operate at that point or follow that path.

The use of input variables including the optimizable input(s) 1304 is measured and the estimation method 1306 is updated using the model adjust module 1320 to make its prediction for the reported system status 1322 closer to the use or consumption measurement 1308 of the optimizable inputs 1304.

Note that the optimization module 1316, controller 1318 and measurement module 1308 can reside in one or more devices, or be embedded in the system 1302, leading to different example embodiments. In some example embodiment, the optimization method 1316 can be executed upfront, by a microprocessor device. A particular model or method can then be subsequently selected from a set of predetermined models or methods which best optimizes the optimum point/path 1312.

Accordingly, the control system 1300 controls the system 1302, to produce the desired output(s) 1310 while optimizing the use of one or more optimizable input(s) 1304 by dynamically determining an optimization method 1316 to predict the amount of the optimizable input(s) 1304 used at each possible operation point or path (e.g. operation trajectory in time) that produces the desired output(s) 1310, then finding the optimal point/path 1312, and finally commanding the controllable variables 1304 to achieve said optimal point or trajectory 1312.

In some example embodiments, rather than through the measurements 1308, the use of the optimizable inputs is estimated using explicit analytical formulas. In some example embodiments, the system's optimizable inputs use is estimated using numerical tables.

In some example embodiments, the optimizable inputs estimation module 1306 or formulae is simple enough that they allow solving analytically the optimization and obtaining explicit formulas, parametric in the output(s) 1310 and non-controllable variables 1314, to command the controllable variables 1304.

In some example embodiments, the optimization module 1316 is numerically solved upfront, thus resulting in numerical table(s) and/or explicit formulas to command the controllable variables 1304.

In some example embodiments, the optimization module 1316 is performed by a microprocessor based device executing software while the system is running, and for the particular non-controllable conditions the optimization module 1316 is encountering.

In some example embodiments, the estimation module 1306 or formulas have tuning parameters and these and/or the values in the table(s) are periodically adjusted based on the actual use of optimizable inputs measured. A system test can be implemented at specified times to eliminate some variables to increase the accuracy of the estimation module 1306.

Variations may be made in example embodiments of the present disclosure. Some example embodiments may be applied to any variable speed device, and not limited to variable speed control pumps. For example, some additional embodiments may use different parameters or variables, and may use more than two parameters (e.g. three parameters on a three dimensional graph). For example, the speed (rpm) is also illustrated on the described control curves. Further, temperature (Fahrenheit) versus temperature load (BTU/hr) may be parameters or variables which are considered for control curves, for example for variable temperature control which can be controlled by a variable speed circulating fan. Some example embodiments may be applied to any devices which are dependent on two or more correlated parameters. Some example embodiments can include variables dependent on parameters or variables such as liquid, temperature, viscosity, suction pressure, site elevation and number of pump operating.

In example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A control system, comprising:
   one or more operable elements resulting in output variables, at least one of the operable elements including a respective controllable motor, wherein there is more than one operation point or path of system variables that can provide a given output setpoint, wherein at least one system variable at an operation point or path restricts operation of another system variable at the operation point or path; and
   one or more controllers configured to operate in a control loop to:
   detect input variables, the input variables including non-controllable variables and system controllable variables, the non-controllable variables including output demand, the system controllable variables include at least one optimizable input variable,
   detect the system variables,
   update a model with respect to the at least one optimizable input variable, comprising calculating the updated model using established relationships between variables, the detected input variables and the detected system variables, the updated model providing, based on the established relationships between variables, prediction of use of the input variables in possible operation points or paths of the system variables which achieve an output setpoint, and
   operate, based on one or more of the detected input variables and the detected system variables, the one or more operable elements in accordance with the updated model to provide an optimal operation path of the system variables which achieves the output setpoint and which optimizes consumption of the at least one optimizable input variable;
   wherein for iterations of the control loop said updating of the model is based on said operating of the one or more operable elements during the control loop.

2. The control system as claimed in claim 1, wherein the control loop is performed during initial setup and subsequent operation of the one or more operable elements.

3. The control system as claimed in claim 1, wherein a non controllable input variable includes a variable system hydraulic resistance.

4. The control system as claimed in claim 1, wherein the one or more controllers are further configured to perform a system review through specified operation of the output variables to calibrate at least one optimizable input variable.

5. The control system as claimed in claim 4, further comprising a plurality of valves, wherein during the system review the one or more controllers are further configured to cause the valves to be fully open by reducing a speed of at least one of the controllable motors and configured to determine a minimum system hydraulic resistance as one of the system variables.

6. The control system as claimed in claim 1, wherein said updating includes updating the model for subsequent iterations of the control loop.

7. The control system as claimed in claim 1, wherein the optimizable input variable comprises a power efficiency variable of the one or more operable elements.

8. The control system as claimed in claim 1, wherein said detecting of the output variables comprises self-detecting device properties of the operable element and correlating to the output variables.

9. The control system as claimed in claim 1, wherein said optimizing includes maintaining a specified average value of the at least one optimizable input variable.

10. The control system as claimed in claim 1, wherein said optimizing includes maintaining a specified operation range of the at least one optimizable input variable.

11. The control system as claimed in claim 1, wherein said optimizing includes maintaining a specified distribution, detected over a specified operation time, of the at least one optimizable input variable.

12. The control system as claimed in claim 1, wherein at least one optimizable input variable is a consumable input variable.

13. The control system as claimed in claim 1, wherein detecting of the system variables further includes correlating at least one of the system variables from at least one self-detected device property of the one or more operable elements.

14. The control system as claimed in claim 1:
further comprising a chilled circulating system including a refrigerant,
wherein the one or more operable elements includes a compressor having the respective controllable motor for controlling circulation of the refrigerant, resulting in the output variables including lift and flow for the refrigerant.

15. The control system as claimed in claim 1:
further comprising a circulating medium,
wherein the one or more operable elements includes a control pump having the respective controllable motor for controlling circulation of the circulating medium, resulting in the output variables including pressure and flow for the circulating medium.

16. The control system as claimed in claim 1, wherein the output variables include a temperature variable to achieve the output setpoint.

17. The control system as claimed in claim 1, wherein the non-controllable variables include outdoor temperature.

18. The control system as claimed in claim 1, wherein when the one or more controllers determine that the one of the operable elements is performing off of the model, the one or more controllers are configured to attempt to operate the one of the operable elements to operate onto the model which achieves the output setpoint.

19. The control system as claimed in claim 1, wherein when the one or more controllers determine that the one of the operable elements is performing off of the model, the one or more controllers are configured to operate at least one of the other operable elements to compensate for the one of the operable elements.

20. The control system as claimed in claim 19, wherein when the one or more controllers determine that the one of the operable elements is performing off of the model, the one or more controllers are configured to stop operation of the one of the operable elements.

21. The control system as claimed in claim 1, wherein the at least one optimizable input variable includes power consumed or money.

22. The control system as claimed in claim 1, wherein the one or more controllers are performing off of the model due to damage or underperforming.

23. The control system as claimed in claim 1, wherein the updating the model comprises learning by the one or more controllers.

24. A method for controlling one or more operable elements resulting in output variables, at least one of the operable elements including a respective controllable motor, wherein there is more than one operation point or path of system variables that can provide a given output setpoint, wherein at least one system variable at an operation point or path restricts operation of another system variable at the operation point or path, the method comprising:
performing a control loop comprising:
detecting input variables, the input variables including non-controllable variables and system controllable variables, the non-controllable variables including output demand, the system controllable variables include at least one optimizable input variable,
detecting the system variables,
updating a model with respect to the at least one optimizable input variable, comprising calculating the updated model using established relationships between variables, the detected input variables and the detected system variables, the updated model providing, based on the established relationships between variables, prediction of use of the input variables in possible operation points or paths of the system variables which achieve an output setpoint, and
operating, based on one or more of the detected input variables and the detected system variables, the one or more operable elements in accordance with the updated model to provide an optimal operation path of the system variables which achieves the output setpoint and which optimizes consumption of the at least optimizable one input variable;
wherein for iterations of the control loop said updating of the model is based on said operating of the one or more operable elements during the control loop.

25. A non-transitory computer readable medium comprising instructions which, when executed by one or more controllers, cause the controllers to control one or more operable elements resulting in output variables, at least one of the operable elements including a respective controllable motor, wherein there is more than one operation point or path of system variables that can provide a given output setpoint, wherein at least one system variable at an operation point or path restricts operation of another system variable at the operation point or path, the instructions comprising:
instructions for operating in a control loop to:
detect input variables, the input variables including non-controllable variables and system controllable variables, the non-controllable variables including output demand, the system controllable variables include at least one optimizable input variable, detect the system variables,
update a model with respect to the at least one optimizable input variable, comprising calculating the updated model using established relationships between variables, the detected input variables and the detected system variables, the updated model providing, based on the established relationships between variables, prediction of use of the input variables in possible operation points or paths of the system variables which achieve an output setpoint, and
operate, based on one or more of the detected input variables and the detected system variables, the one or more operable elements in accordance with the updated model to provide an optimal operation path of the system variables which achieves the output setpoint and which optimizes consumption of the at least one optimizable input variable;

wherein for iterations of the control loop said updating of the model is based on said operating of the one or more operable elements during the control loop.

* * * * *

UNITED STATES PATENT AND TRADEMARK OFFICE
CERTIFICATE OF CORRECTION

PATENT NO. : 11,953,864 B2
APPLICATION NO. : 18/220138
DATED : April 9, 2024
INVENTOR(S) : Marcelo Javier Acosta Gonzalez It is certified that error appears in the above-identified patent and that said Letters Patent is hereby corrected as shown below:

In the Specification

Please replace "*(Q/QD))" with -- *(Q/QD) -- (Column 12, Line 31).

Please replace "*(Q/QD))" with -- *(Q/QD) -- (Column 12, Line 34).

Please replace "therafter;" with -- thereafter; -- (Column 18, Line 45).

Signed and Sealed this
Tenth Day of September, 2024

Katherine Kelly Vidal
*Director of the United States Patent and Trademark Office*